US011010749B2

(12) United States Patent
Park et al.

(10) Patent No.: US 11,010,749 B2
(45) Date of Patent: May 18, 2021

(54) PAYMENT PROCESSING METHOD AND ELECTRONIC DEVICE SUPPORTING THE SAME

(71) Applicant: Samsung Electronics Co., Ltd., Gyeonggi-do (KR)

(72) Inventors: Tae Kyoung Park, Gyeongsangbuk-do (KR); June Yeob Kim, Daegu (KR); Seung Hwan Choi, Gyeonggi-do (KR); Ki Bong Kim, Daegu (KR)

(73) Assignee: Samsung Electronics Co., Ltd

( * ) Notice: Subject to any disclaimer, the term of this patent is extended or adjusted under 35 U.S.C. 154(b) by 1155 days.

(21) Appl. No.: 15/406,275

(22) Filed: Jan. 13, 2017

(65) Prior Publication Data

US 2017/0200146 A1    Jul. 13, 2017

(30) Foreign Application Priority Data

Jan. 13, 2016  (KR) .................. 10-2016-0004038

(51) Int. Cl.
*G06Q 20/32*    (2012.01)
*G06Q 20/22*    (2012.01)
(Continued)

(52) U.S. Cl.
CPC ....... *G06Q 20/3278* (2013.01); *G06Q 20/102* (2013.01); *G06Q 20/227* (2013.01);
(Continued)

(58) Field of Classification Search
CPC .. G06F 3/0488; G06F 3/04883; G06F 3/0482; G06F 3/04817; G06F 3/04842;
(Continued)

(56) References Cited

U.S. PATENT DOCUMENTS 8,196,131 B1    6/2012  von Behren et al.
8,577,803 B2 *  11/2013  Chatterjee .............. G06Q 20/36
                                                                  705/41

(Continued)

FOREIGN PATENT DOCUMENTS

CN    104050559    9/2014

OTHER PUBLICATIONS

Chiu, "A new era in fintech payment innovations? A perspective from the institutions and regulation of payment systems", Law, Innovation and Technology, vol. 9, No. 2, pp. 190-234 year (Year: 2017).*

(Continued)

*Primary Examiner* — Frantzy Poinvil
(74) *Attorney, Agent, or Firm* — The Farrell Law Firm, P.C.

(57) ABSTRACT

An electronic device and a payment processing method in the electronic device are provided. The electronic device includes a memory configured to store first payment means information corresponding to a first payment means and second payment means information corresponding to a second payment means, and a processor electrically connected with the memory, wherein the processor is configured to execute a first application associated with the first payment means by activating the first payment means information, obtain a request to execute a second application associated with the second payment means, while the first application is executed, and deactivate the first payment means information based on at least the request.

17 Claims, 9 Drawing Sheets

(51) Int. Cl.
*G06Q 20/10* (2012.01)
*G06Q 20/40* (2012.01)

(52) U.S. Cl.
CPC ..... *G06Q 20/3227* (2013.01); *G06Q 20/3229* (2013.01); *G06Q 20/401* (2013.01)

(58) Field of Classification Search
CPC .... G06F 1/163; G06F 3/04886; G06F 3/0484; G06F 3/0412; G06F 2203/04803; G06F 3/017; G06F 3/0416; G06F 21/35; G06F 3/016; G06F 3/0346; G06F 3/0485; G06F 1/1643; G06F 1/1694; G06F 1/3265; G06F 2203/04102; G06F 3/03547; G06F 3/0362; G06F 3/0487; G06F 3/167; G06F 1/165; G06F 1/26; G06F 1/3262; G06F 21/32; G06F 21/34; G06F 2203/0383; G06F 2203/04104; G06F 2203/04109; G06F 2203/04808; G06F 2221/2115; G06F 3/0414; G06F 3/04847; G06F 3/1423; G06F 3/1454; G06F 19/00; G06F 19/3481; G06F 1/1616; G06F 1/1641; G06F 1/1647; G06F 1/1654; G06F 1/1656; G06F 1/1677; G06F 1/1679; G06F 1/3287; G06F 21/31; G06F 21/36; G06F 2203/011; G06F 2203/0381; G06F 3/015; G06F 3/03545; G06F 3/044; G06F 3/04845; G06F 3/1431; G06Q 40/00; G06Q 20/00; G06Q 10/00; G06Q 30/00; G06Q 20/3278; G06Q 20/102; G06Q 20/227; G06Q 20/3227; G06Q 20/3229; G06Q 20/401
USPC .......................................................... 705/40
See application file for complete search history.

(56) References Cited

U.S. PATENT DOCUMENTS

| | | | | |
|---|---|---|---|---|
| 8,615,445 | B2 * | 12/2013 | Dorsey | G07F 7/0886 |
| | | | | 705/26.1 |
| 8,646,059 | B1 | 2/2014 | von Behren et al. | |
| 8,671,055 | B2 * | 3/2014 | Spodak | G06Q 20/3552 |
| | | | | 705/41 |
| 8,676,707 | B2 * | 3/2014 | Flitcroft | G06Q 20/24 |
| | | | | 705/44 |
| 8,763,896 | B2 * | 7/2014 | Kushevsky | G06K 19/0723 |
| | | | | 235/379 |
| 8,781,923 | B2 * | 7/2014 | Pitroda | G06Q 20/3674 |
| | | | | 705/30 |
| 8,807,440 | B1 | 8/2014 | von Behren et al. | |
| 8,924,246 | B1 * | 12/2014 | Chen | G06Q 20/023 |
| | | | | 705/26.82 |
| 9,064,247 | B2 | 6/2015 | Baer et al. | |
| 9,070,127 | B2 * | 6/2015 | Pitroda | G06Q 20/12 |
| 9,569,768 | B2 * | 2/2017 | Kean | G07F 7/10 |
| 9,881,298 | B2 * | 1/2018 | Flitcroft | G06Q 40/04 |
| 2006/0231608 | A1 * | 10/2006 | Gorelick | G06Q 20/381 |
| | | | | 235/379 |
| 2009/0112766 | A1 | 4/2009 | Hammad et al. | |
| 2013/0246145 | A1 * | 9/2013 | Ringewald | G06Q 20/227 |
| | | | | 705/14.23 |
| 2013/0297509 | A1 * | 11/2013 | Sebastian | G06Q 20/3226 |
| | | | | 705/44 |
| 2013/0339166 | A1 | 12/2013 | Baer et al. | |
| 2014/0040127 | A1 * | 2/2014 | Chatterjee | G06Q 20/36 |
| | | | | 705/41 |
| 2014/0129435 | A1 * | 5/2014 | Pardo | G06Q 20/227 |
| | | | | 705/41 |
| 2014/0279437 | A1 | 9/2014 | Lee et al. | |
| 2014/0330713 | A1 * | 11/2014 | Isaacson | G06Q 20/24 |
| | | | | 705/41 |
| 2015/0088747 | A1 * | 3/2015 | Chen | G06Q 20/023 |
| | | | | 705/44 |
| 2015/0091496 | A1 | 4/2015 | Meunler et al. | |
| 2015/0127530 | A1 * | 5/2015 | Wick | G06Q 20/3223 |
| | | | | 705/39 |
| 2015/0235256 | A1 | 8/2015 | Barsoum et al. | |
| 2015/0348014 | A1 * | 12/2015 | Van Os | G06Q 30/0631 |
| | | | | 705/41 |
| 2015/0348018 | A1 * | 12/2015 | Campos | G06Q 20/12 |
| | | | | 705/41 |
| 2017/0011399 | A1 * | 1/2017 | Steinlicht | G06Q 20/3263 |
| 2017/0185996 | A1 * | 6/2017 | Parekh | G06K 19/0712 |

OTHER PUBLICATIONS

European Search Report dated Sep. 4, 2018 issued in counterpart application No. 17151349.2-1217, 8 pages.
European Search Report dated May 19, 2017 issued in counterpart application No. 17151349.2-1871, 9 pages.
GlobalPlatform Card Contactless Services Card Specification v2.2—Amendment C Version 1.1.0.2, pp. 50-55, Apr. 2014.
Chinese Office Action dated Apr. 2, 2020 issued in counterpart application No. 201710020814.5, 10 pages.

* cited by examiner

PAYMENT PROCESSING METHOD AND ELECTRONIC DEVICE SUPPORTING THE SAME

PRIORITY

This application claims priority under 35 U.S.C. § 119(a) to a Korean Patent Application filed on Jan. 13, 2016 in the Korean Intellectual Property Office and assigned Ser. No. 10-2016-0004038, the entire disclosure of which is incorporated herein by reference.

BACKGROUND

1. Field of the Disclosure

The present disclosure relates to payment processing, and more particularly, to a mobile payment processing method for an electronic device including a mobile card (or a smart card) as a mobile payment means.

2. Description of the Related Art

Recently, an electronic device such as a smartphone supports a mobile payment function. For example, a user of an electronic device registers a mobile card (or a smart card) usable as a credit card, a debit card, a transit card, or the like with the electronic device and may use the registered mobile card in a payment method (hereinafter referred to as a payment means).

A mobile payment function may include, for example, a payment mode using a physical secure element (SE), a payment mode which does not use a physical SE, or the like. A mobile payment function may include, for example, a one time password (OTP) mode, a host card emulation (HCE) mode, an embedded secure element (eSE) mode, or the like.

The OTP mode is, for example, a mode of authenticating a user using an OTP randomly generated without using a fixed password and performing a payment. The HCE mode may use near field communication (NFC) and is a mode of communicating with a payment terminal through execution of an application without using a physical SE and performing a payment. The eSE mode is a mode of performing a payment based on an SE embedded in an electronic device in the form of a separate integrated circuit or chip.

In the eSE mode, a point of sale (POS) terminal randomly selects a mobile card to be used as a payment means among mobile cards installed in an eSE based on a pre-determined condition and may proceed with a payment. For example, if an electronic device sends a list of mobile cards installed in an eSE to a POS terminal, the POS terminal selects a mobile card based on a type of a mobile card supported by the POS terminal from the sent list of the mobile cards and may perform a payment in the eSE mode. In this case, if there are a plurality of mobile cards supported by a POS terminal on a list of mobile cards, the POS terminal may randomly select a mobile card based on a pre-determined condition.

It is difficult for a user to select a certain mobile card as a payment means among mobile cards installed in an electronic device in an eSE.

SUMMARY

An aspect of the present disclosure is to provide a payment processing method for deactivating at least one mobile card installed in an eSE and activating a selected mobile card to use the selected mobile card as a payment means and an electronic device for supporting the same.

Another aspect of the present disclosure is to provide a payment processing method for providing an instruction to deactivate mobile cards installed in an eSE and an instruction to activate a selected mobile card as one instruction or providing at least one of the above-mentioned instructions included in another instruction and an electronic device for supporting the same.

In accordance with an aspect of the present disclosure, an electronic device is provided. The electronic device includes a memory configured to store first payment means information corresponding to a first payment means and second payment means information corresponding to a second payment means, and a processor electrically connected with the memory, wherein the processor is configured to execute a first application associated with the first payment means by activating the first payment means information, obtain a request to execute a second application associated with the second payment means, while the first application is executed, and deactivate the first payment means information based on at least the request.

In accordance with another aspect of the present disclosure, an electronic device is provided. The electronic device includes an eSE configured to comprise a plurality of payment means, a memory configured to store a payment application for supporting a payment using one of the plurality of payment means, a display configured to display an execution screen of the payment application, a short-range communication module configured to send information about at least one payment means which is in an active status among the plurality of payment means to an external device through short-range communication, and a processor electrically connected with the eSE, the memory, the display, and the short-range communication module, wherein the processor is configured to activate a first payment means, if a user input for selecting the first payment means among the plurality of payment means is obtained, and deactivate payment means other than the first payment means among the plurality of payment means.

In accordance with another aspect of the present disclosure, a payment processing method in an electronic device is provided. The method includes obtaining a user input for selecting a first payment means among a plurality of payment means included in an eSE of the electronic device, activating the first payment means, and deactivating the other payment means except for the first payment means among the plurality of payment means.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
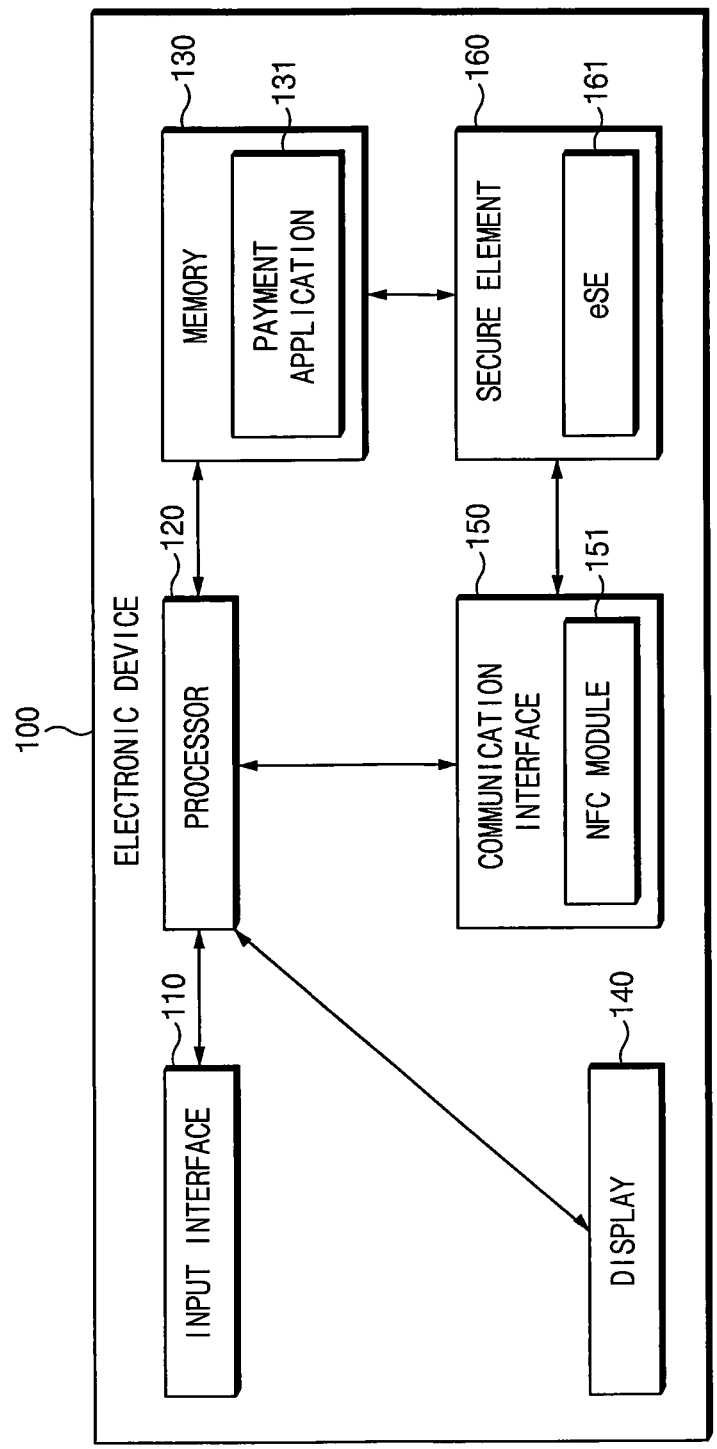
FIG. 1 is a block diagram of an electronic device associated with processing a payment according to an embodiment of the present disclosure.

Hereinafter, various embodiments of the present disclosure are disclosed with reference to the accompanying drawings. However, the present disclosure is not intended to be limited by the various embodiments of the present disclosure to a certain embodiment, and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms used in the following description and claims are not intended to be limited to their dictionary meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, a reference to "a component surface" includes a reference to one or more of such surfaces.

The terms "include," "comprise," "have," "may include," "may comprise," and "may have" used herein indicate disclosed functions, steps, or the existence of elements but do not exclude other functions, operations or elements.

For example, the expressions "A or B" and "at least one of A and/or B" may indicate A and B, A, or B. For instance, the expressions "A or B" and "at least one of A and/or B" may indicate (1) at least one A, (2) at least one B, or (3) at least one A and at least one B.

The terms such as "1st," "2nd," "first," "second," and the like used herein may refer to modifying various elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed by" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding step or a general purpose processor (for example, a central processing unit (CPU) or an application processor (AP)) for performing corresponding steps by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meanings of the related art, and, unless clearly defined herein, are not intended to be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In various embodiments of the present disclosure, an electronic device may be a home appliance. A smart home appliance may include at least one of, for example, a television (TV), a digital video/versatile disc (DVD) player, an audio player, a refrigerator, an air conditioner, a cleaner, an oven, a microwave oven, a washing machine, an air cleaner, a set-top box, a home automation control panel, a security control panel, a television (TV) box (e.g., Samsung HomeSync®, Apple TV®, or Google TV™), a game console (e.g., Xbox® or PlayStation®), an electronic dictionary, an electronic key, a camcorder, or an electronic picture frame In various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA) device, a magnetic resonance imaging (MRI) device, a computed tomography (CT) device, a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automated teller machine (ATM), a POS device of a store, or an Internet of Things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to various embodiments of the present disclosure may be a flexible device. An electronic device according to an embodiment of the present disclosure is not limited to the above-mentioned devices, but may include electronic devices subsequently developed.

Hereinafter, an electronic device according to various embodiments of the present disclosure is described in more detail with reference to the accompanying drawings. The term "user" used herein may refer to a person who uses an electronic device or may refer to a device (e.g., an artificial intelligence electronic device) that uses an electronic device.

FIG. 1 is a block diagram of an electronic device 100 associated with processing a payment according to an embodiment of the present disclosure. The electronic device 100 may perform a mobile payment using an SE 160. For example, the electronic device 100 may perform a mobile payment using at least one payment means (e.g., a mobile card) installed in an embedded SE 161. The electronic device 100 may select a certain mobile card among at least one mobile card installed in the eSE 161 and may perform a payment. Thus, a user of the electronic device 100 may select a desired payment means and may perform a mobile payment.

Referring to FIG. 1, the electronic device 100 may include an input interface 110, a processor 120, a memory 130, a display 140, a communication interface 150, and the SE 160. The input interface 110 may play a role, for example, as an interface which may transmit a command or data, input from a user or another external device, to another component (other components) of the electronic device 100. According to an embodiment of the present disclosure, the input interface 110 may obtain an input of a user on an execution screen of a payment application 131, provided on the display 140. For example, the input interface 110 may obtain an input for selecting a payment means or an input for selecting an object (e.g., a button object) corresponding to a function such as a payment approval/cancellation function.

The processor 120 may perform data processing or a step related to communication and/or control of at least one of the other elements of the electronic device 100. The processor 120 may execute or run an operating system or an application program (e.g., the payment application 131) so as to control a plurality of hardware or software elements connected to the processor 120, and may process various data and perform steps.

According to an embodiment of the present disclosure, the processor 120 may provide an environment for a mobile payment. The processor 120 may execute the payment application 131 and may output an execution screen of the payment application 131 on the display 140.

According to an embodiment of the present disclosure, if an input for is received selecting a payment means via the input interface 110 (e.g., if a certain payment means is selected from a list of payment means displayed on the display 140), the processor 120 may activate the selected payment means among at least one payment means included in the SE 160. In addition, the processor 120 may deactivate at least one payment means included in the SE 160 before activating the selected payment.

A function of activating and/or deactivating a payment means may vary according to a type of the SE 160. In the present disclosure, a description is provided of a function of activating and/or deactivating a payment means (e.g., a mobile card) installed in the eSE 161 included in the SE 160.

According to an embodiment of the present disclosure, the processor 120 may use a status change instruction (e.g., a "SET STATUS" instruction) of a mobile card of a contactless registry service (CRS) to activate and/or deactivate a mobile card installed in the eSE 161. If a certain mobile card is activated using a status change instruction of the mobile card, the processor 120 may first deactivate a status of at least one mobile card installed in the eSE 161 and may activate the certain mobile card. In this case, the processor 120 may send an instruction to deactivate the at least one mobile card installed in the eSE 161 and an instruction to activate the certain mobile card to the eSE 161. In addition, the processor 120 may send an instruction to deactivate an activated specific mobile card and an instruction to change a status of each of deactivated mobile cards to a previous status to the eSE 161 to restore a status of each of the mobile cards to a status before the status change instruction of the mobile card is used.

According to an embodiment of the present disclosure, the processor 120 may provide an instruction to deactivate at least one mobile card installed in the eSE 161 and an instruction to activate a certain mobile card as one instruction (e.g., a "START USE CARD" instruction). The processor 120 may deactivate an at least one mobile card installed in the eSE 161 and may activate a certain mobile card by sending identification information (e.g., an applet identifier (AID)) of the specific mobile card to be activated together with the "START USE CARD" instruction to the eSE 161 (e.g., by specifying identification information of the specific mobile card as a parameter of a "START USE CARD" function (or an application programming interface (API)).

According to an embodiment of the present disclosure, the processor 120 may provide an instruction to deactivate at least one mobile card installed in the eSE 161 and an instruction to activate a certain mobile card, included in at least another instruction. The processor 120 may provide an instruction to deactivate at least one mobile card installed in the eSE 161 included in an instruction (e.g., a "START SAMSUNG PAY" instruction) to set up an execution environment of the payment application 131. For example, if a request is received to execute a payment application 131 associated with the eSE 161, the processor 120 may send a "START SAMSUNG PAY" instruction to the eSE 161. In this case, the eSE 161 may set up an execution environment of the payment application 131 and may deactivate at least one mobile card installed in the eSE 161. If the "START SAMSUNG PAY" instruction is executed, the eSE 161 may send status information of at least one mobile card installed in the eSE 161 to the processor 120 before deactivating the at least one mobile card installed in the eSE 161. The processor 120 may store sent status information of a mobile card in the memory 130.

According to an embodiment of the present disclosure, the processor 120 may shorten a payment processing time by providing an instruction to deactivate mobile cards installed in the eSE 161 and an instruction to activate a selected mobile card as one instruction or providing at least one of the above-mentioned instructions, included in another instruction. For example, since it is unnecessary for the processor 120 to know identification information about all mobile cards installed in the eSE 161, used for the above-mentioned instructions, a request time for the identification information may be reduced. If it is unnecessary for the processor 120 to send each of the above-mentioned instructions to the eSE 161, a time when it sends the instructions to the eSE 161 may be reduced.

In addition, if there are a plurality of mobile cards installed in the eSE 161, the processor 120 may send information (e.g., identification information) about the plurality of mobile cards together with a corresponding instruction (e.g., an instruction to change a status of each of the plurality of mobile cards) to the eSE 161 to deactivate the plurality of mobile cards installed in the eSE 161. However, if the sum of a data size for information of mobile cards and a data size for an instruction to change a status of each of the mobile cards is greater than a certain size (e.g., 256 bytes) because there are many mobile cards, the processor 120 should divide information of the mobile cards and should transmit the divided information to deactivate the plurality of mobile cards. Thus, the processor 120 may increase a processing time by sending the corresponding instruction to the eSE 161 several times. However, if providing an instruction to deactivate mobile cards installed in the eSE 161 and an instruction to activate a selected mobile card as one instruction, the processor 120 must only send the instruction to the eSE 161 once because of sending only information of the selected mobile card together with the corresponding instruction. In addition, similarly, if information of a mobile card to be transmitted is encrypted, because of encrypting only the information of the selected mobile card, the processor 120 may reduce a time required for the encryption.

According to an embodiment of the present disclosure, to restore a status of each of mobile cards to a status before a status change instruction of a mobile card is performed, the processor 120 may provide an instruction to deactivate an activated mobile card and an instruction to change a status of each of deactivated other mobile cards to a previous status as one instruction (e.g., an "END USE CARD" instruction). The processor 120 may send status information of a mobile card, stored in the memory 130, together with the "END USE CARD" instruction to the eSE 161. In this case, the eSE 161 may deactivate the activated mobile card based on status information of the mobile card and may restore a status of at least one deactivated mobile card to a status before the status change instruction of the mobile card is performed.

According to an embodiment of the present disclosure, the processor 120 may provide an instruction to deactivate an activated mobile card and an instruction to change a status of at least one deactivated mobile card to a previous status included in at least another instruction. The processor 120 may provide an instruction to change a status of at least one deactivated mobile card to a previous status included in an instruction (e.g., an "END SAMSUNG PAY" instruction) to terminate an execution environment of the payment application 131 (e.g., to collect used resources). For example, if a request is received to terminate the payment application 131 associated with the eSE 161, the processor 120 may send the "END SAMSUNG PAY" instruction to the eSE 161. In this case, the eSE 161 may change the status of the at least one mobile card to the previous status. If the status of each of the mobile cards is restored to the status before the status change instruction of the mobile card is performed, the processor 120 may control the memory 130 to delete status information of the mobile card, stored in the memory 130.

The memory 130 may store instructions or data related to at least one of the other elements of the electronic device 100. According to an embodiment of the present disclosure, the memory 130 may store the payment application 131. The payment application 131 may include a module, a program, a routine, sets of instructions, a process, or the like implemented to perform mobile payment via at least one payment means included in the SE 160. If executed by the processor 120, the payment application 131 may provide a user interface for selecting a payment means or a user interface for performing a function such as a payment approval/cancellation function. The payment application 131 may be referred to as a mobile wallet, a smart wallet, and the like. The memory 130 may store status information of a payment means (e.g., a mobile card), payment means information (e.g., a type of the mobile card, a number of the mobile card, a password of the mobile card, or the like).

The display 140 may present various content (e.g., a text, an image, a video, an icon, a symbol, or the like) to the user. According to an embodiment of the present disclosure, the display 140 may output an execution screen of the payment application 131. The display 140 may include a touch screen. The display 140 may receive a touch, gesture, proximity or hovering input from an electronic pen or a part of a body of the user.

The communication interface 150 may set communications between the electronic device 100 and an external device (e.g., a POS terminal). For example, the communication interface 160 may be connected to a network via wireless communications or wired communications so as to communicate with the external device. According to an embodiment of the present disclosure, the communication interface 150 may include an NFC module 151. The NFC module 151 may be a contactless module (CM) which supports NFC which is a kind of contactless communication with a reader terminal for supporting short-range communication and communicates wireless data.

The SE 160 may be a storage medium which securely stores information (e.g., authentication information) requested to perform security and applications (e.g., applets) using the information and may include a subscriber identity module/universal integrated circuit card (SIM/UICC), the eSE 161, a micro secure digital (SD) card, or the like. According to an embodiment of the present disclosure, the SE 160 may be configured with a separate chip and the like. The SE 160 may include a separate processor, a permanent storage device, a memory, a register, or the like.

According to an embodiment of the present disclosure, a mobile card may be issued to the SE 160 and may include an application (e.g., an applet). The application may request payment approval while transmitting payment related information (e.g., payment means information and payment information) for mobile payment through contactless communication between the electronic device 100 and an external device (e.g., a POS terminal). A mobile card may be used for at least one of a credit card function, a debit card function, or a transit card function. At least one mobile card may be issued to the eSE 161, and the issued mobile card may be stored in the eSE 161.

According to an embodiment of the present disclosure, the SE 160 may include an application (e.g., an applet) for managing (or changing) a status of a payment means (e.g., a mobile card). An application for managing the status of the payment means may activate or deactivate payment means information by changing a status value of a payment means stored in the memory 130 or a separate memory, a register, or the like included in the SE 160 (e.g., a flag corresponding to an active status or an inactive status). An application for managing the status of a payment means may be executed by the processor 120 or a separate processor included in the SE 160.

A description is provided below of the electronic device 100 associated with processing a payment using the eSE 161 and the NFC module 151.

Figure 2:
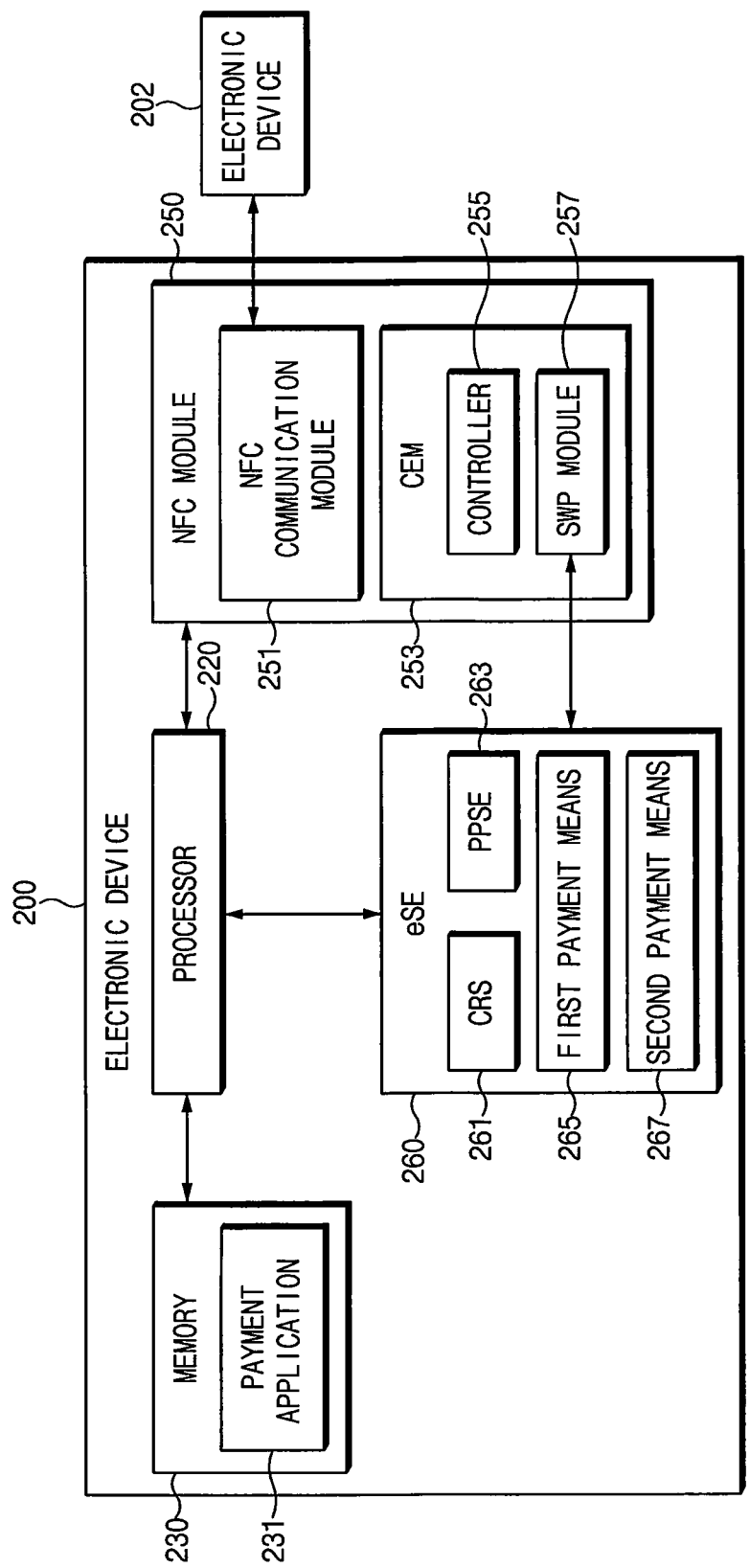
FIG. 2 is a block diagram of an electronic device associated with processing a payment using an eSE and an NFC module according to an embodiment of the present disclosure.

FIG. 2 is a block diagram of an electronic device 200 associated with processing a payment using an eSE 260 and an NFC module 250 according to an embodiment of the present disclosure. The electronic device 200 shown in FIG. 2 may have the same or a similar configuration as the electronic device 100 shown in FIG. 1. A description for the same or similar components in FIG. 2 as the above-described electronic device 100 is omitted here. A detailed description of the eSE 260 and the NFC module 250 is provided below.

Referring to FIG. 2, the electronic device 200 may include a processor 220, a memory 230, the NFC module 250, and the eSE 260. The electronic device 200 may connect with an external electronic device 202 (e.g., a POS terminal) via the NFC module 250. Herein, the external electronic device 202 may be a payment terminal, may obtain payment card information (or payment means information), and may send a payment request together with payment information (e.g., a payment object (or item), information about a seller of the payment object, a payment amount, or the like) to a service provider server (e.g., a payment server).

The NFC module 250 may include an NFC communication module 251 and a card emulation module (CEM) 253. The NFC communication module 251 may perform NFC between the electronic device 200 and the external electronic device 202. For example, the electronic device 200 and the external electronic device 202 may connect with each other via NFC of the NFC communication module 251 and may communicate wireless data.

The CEM 253 may be a module for supporting a card emulation mode in NFC and may include a controller 255 and a single wire protocol (SWP) module 257. The controller 255 may select the SWP module 257 and may communicate with the eSE 260 via the SWP module 257. In addition, the controller 255 may select one of a plurality of payment means (e.g., a first payment means 265 and a second payment means 267) included in the eSE 260. The SWP module 257 may provide a single-wire connection interface between the NFC module 250 and the eSE 260. For example, the SWP module 257 may directly connect and communicate with the eSE 260.

The eSE 260 may include a CRS 261, a proximity payment system environment (PPSE) 263, and the plurality of payment means (e.g., the first payment means 265 and the second payment means 267). The CRS 261 may control an overall operation of the eSE 260, manage access to the eSE 260, and provide information associated with a payment to a payment application 231. The PPSE 263 may be an application (e.g., an applet) for providing information (e.g., an AID) of each of mobile terminals available for payment (or activated mobile cards). The first payment means 265 and the second payment means 267 may include a first mobile card and a second mobile card, respectively. Each of the first payment means 265 and the second payment means 267 may be an application (e.g., an applet) for requesting payment approval while transmitting payment means information for a payment (e.g., a type of a mobile card, a number of the mobile terminal, a password of the mobile card, or the like) to a payment terminal (e.g., a POS terminal). According to an embodiment of the present disclosure, the first payment means 265 or the second payment means 267 may be used for at least one of a credit card function, a debit card function, or a transit card function.

According to an embodiment of the present disclosure, the eSE 260 may operate in the form of an operating system (OS) including the CRS 261, the PPSE 263, at least one payment means, a registry, and the like and may provide a mobile payment function of the electronic device 200 according to a specification defined in the Global Platform, which is a standard of an open payment system. In addition, the eSE 260 may provide a mobile payment function through an added instruction (e.g., a "START SAMSUNG PAY" instruction, an "END SAMSUNG PAY" instruction, a "START USE CARD" instruction, an "END USE CARD" instruction, a "SET DEFAULT CARD" instruction, or the like) other than an instruction defined in the specification of the Global Platform. The above-mentioned added instruction may include an instruction associated with activating and/or deactivating a mobile card, and the like.

As described above, according to an embodiment of the present disclosure, an electronic device may include a memory configured to store first payment means information corresponding to a first payment means and second payment means information corresponding to a second payment means, and a processor electrically connected with the memory. The processor may be configured to execute a first application associated with the first payment means, where executing the first application includes activating the first payment means information, obtaining a request to execute a second application associated with the second payment means, while the first application is executed, and deactivating the first payment means information based on at least the request.

According to an embodiment of the present disclosure, the processor may be configured to activate the second payment means information based on at least execution of the second application.

According to an embodiment of the present disclosure, the processor may be configured to activate the first payment means information based on a termination of the second application, and deactivate the second payment means information.

According to an embodiment of the present disclosure, the memory may include a universal integrated circuit card (UICC) or an eSE.

According to an embodiment of the present disclosure, the processor may be configured to receive another request for performing a payment, verify payment means information available for the payment, perform the payment without authenticating a user corresponding to the electronic device, if the payment means information is the first payment means information, and selectively perform the payment based on the result of the authentication for the user, if the payment means information is the second payment means information.

According to an embodiment of the present disclosure, the processor may be configured to select the first payment means or the second payment means based on at least a user input, and activate one of the first payment means information or the second payment means information based on the selection.

As described above, according to an embodiment of the present disclosure, an electronic device may include an eSE configured to comprise a plurality of payment means, a memory configured to store a payment application for supporting payment using one of the plurality of payment means, a display configured to display an execution screen of the payment application, a short-range communication module configured to send information about at least one payment means which is in an active status among the plurality of payment means to an external device through short-range communication, and a processor electrically connected with the eSE, the memory, the display, and the short-range communication module. The processor may be configured to activate a first payment means, if a user input for selecting the first payment means among the plurality of payment means is obtained, and deactivate the other payment means except for the first payment means among the plurality of payment means.

According to an embodiment of the present disclosure, the processor may be configured to deactivate the first payment means, if payment using the activated first payment means is completed.

According to an embodiment of the present disclosure, the processor may be configured to restore a status of each of the plurality of payment means to a status before the user input is obtained, if payment using the activated first payment means is completed.

According to an embodiment of the present disclosure, the plurality of payment means may include a second payment means configured to perform a transit card function. The processor may be configured to activate the second payment means, if payment using the activated first payment means is completed, and deactivate the other payment means except for the second payment means.

According to an embodiment of the present disclosure, the processor may be configured to store status information of the plurality of payment means in the memory, if the user input for selecting the first payment means is obtained.

According to an embodiment of the present disclosure, the processor may be configured to store status information of the plurality of payment means in the memory, if the payment application is executed, and deactivate the plurality of payment means.

According to an embodiment of the present disclosure, the processor may be configured to restore a status of each of the plurality of payment means based on the status information of the plurality of payment means stored in the memory, upon termination of the payment application.

Figure 3:
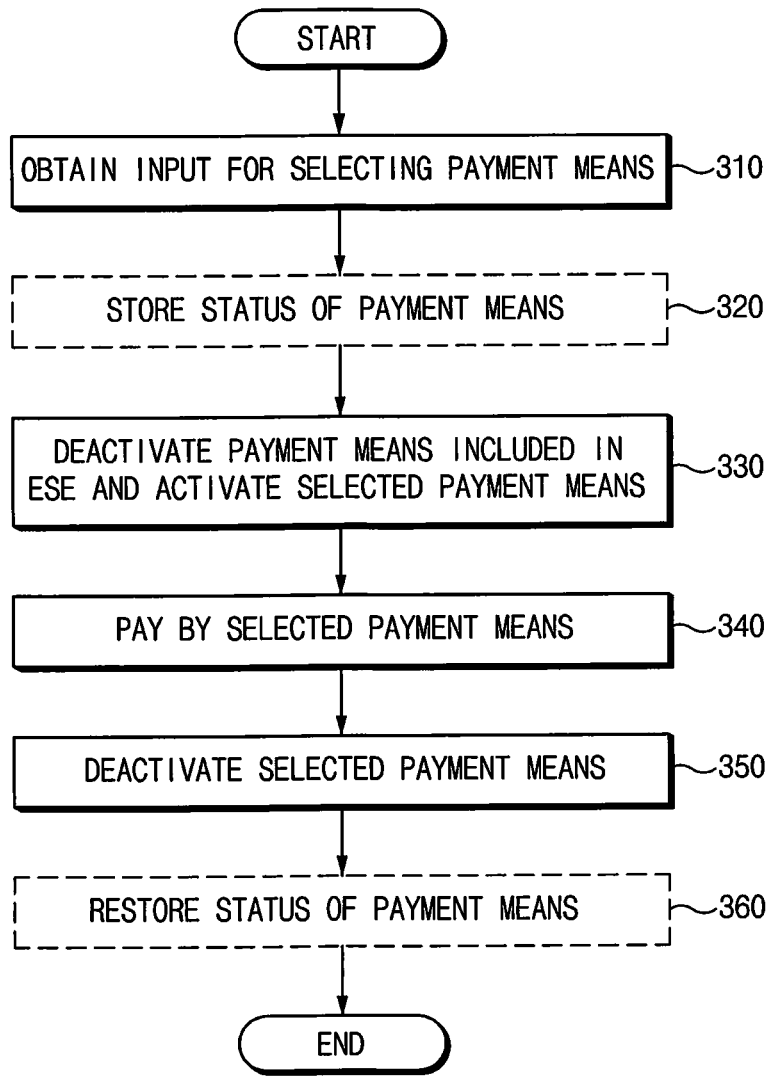
FIG. 3 is a flowchart of a method of operating an electronic device associated with processing a payment according to an embodiment of the present disclosure.

FIG. 3 is a flowchart of a method of operating an electronic device associated with processing a payment according to an embodiment of the present disclosure.

Referring to FIG. 3, in step 310, an electronic device (e.g., the electronic device 100 of FIG. 1 or the electronic device 200 of FIG. 2) may obtain an input for selecting a payment means. According to an embodiment of the present disclosure, the electronic device may output an execution screen of a payment application on its display and may receive an input for selecting a mobile card to be used for payment from its user via its input interface.

In step 320, the electronic device may store information about a current status (e.g., an active status or an inactive status) of at least one payment means included in its eSE in its memory. According to an embodiment of the present disclosure, the eSE may send status information of at least one mobile card installed in the eSE to a processor of the electronic device. The processor may store the sent status information of the mobile card in the memory.

In step 330, the electronic device may deactivate the at least one payment means included in the eSE and may activate a selected payment means. According to an embodiment of the present disclosure, the electronic device may activate and/or deactivate its payment means using a status change instruction (e.g., a "SET STATUS" instruction) of a mobile card of its CRS. The electronic device may deactivate the at least one payment means included in the eSE and may activate a selected payment means, using a "START USE CARD" instruction. For example, the processor may send identification information (e.g., an AID) of the selected payment means together with the "START USE CARD" instruction to the eSE.

According to an embodiment of the present disclosure, the electronic device may perform an operation of storing status information of a payment means in response to a request to execute a payment application and an operation of deactivating the at least one payment means included in the eSE. The electronic device may perform an operation of setting up an execution environment of the payment application using a "START SAMSUNG PAY" instruction and storing status information of the payment means and an operation of deactivating the at least one payment means included in the eSE. In this case, in step 330, the electronic device may perform only an operation of activating the selected payment means.

In step 340, the electronic device may perform a payment using a selected (or activated) payment means. According to an embodiment of the present disclosure, the electronic device may send payment means information of the activated payment means (e.g., a type of a card, a number of the card, a password of the card, or the like) to a payment terminal (e.g., a POS terminal) to perform a payment. The electronic device may perform user authentication through fingerprint recognition and the like before sending the payment means information to the payment terminal. In addition, the electronic device may encrypt the payment means information and may send the encrypted payment means information to the payment terminal.

In step 350, the electronic device may deactivate the selected payment means. The operation of deactivating the selected payment means after the payment is completed may be to prevent additional payment the user does not want. According to an embodiment of the present disclosure, the electronic device may fail to deactivate the selected payment means before the payment application is terminated.

In step 360, the electronic device may restore a status of the at least one payment means included in the eSE to a status where the at least one payment means included in the eSE is deactivated (e.g., a status before step 330 is performed) using the status information of the mobile card stored in the memory. According to an embodiment of the present disclosure, the electronic device may restore a status of a payment means using the status change instruction (e.g., the "SET STATUS" instruction). The electronic device may restore a status of at least one payment means in response to a request to terminate the payment application. The electronic device may terminate an execution environment of the payment application using an "END SAMSUNG PAY" instruction and may restore a status of at least one payment means using status information of a payment means stored in the memory.

According to an embodiment of the present disclosure, the electronic device may perform steps 350 and 360 using an "END USE CARD" instruction, for example, may deactivate the selected payment means and may restore the status of the at least one payment means.

According to an embodiment of the present disclosure, the electronic device may fail to perform at least one of step 320 or step 360. For example, the electronic device may fail to store status information of a payment means in the memory and may fail to restore the status of the payment means.

According to an embodiment of the present disclosure, the electronic device may separately store information (e.g., an AID) associated with the selected payment means in a certain area of the memory and may use the stored information for payment rather than storing, changing, and restoring the status of the payment means in the above-described steps (e.g., steps 320 to 360). For example, if a certain payment means is selected in step 310, the electronic device may store information associated with the selected payment means in a certain area of the memory and may omit steps 320 and 330 to perform step 340. In this case, in step 340, the electronic device may perform payment using the information associated with the payment means stored in the certain area of the memory. In addition, the electronic device may omit steps 350 and 360 after completing the payment and may delete the information associated with the payment means stored in the certain area of the memory.

Figure 4:
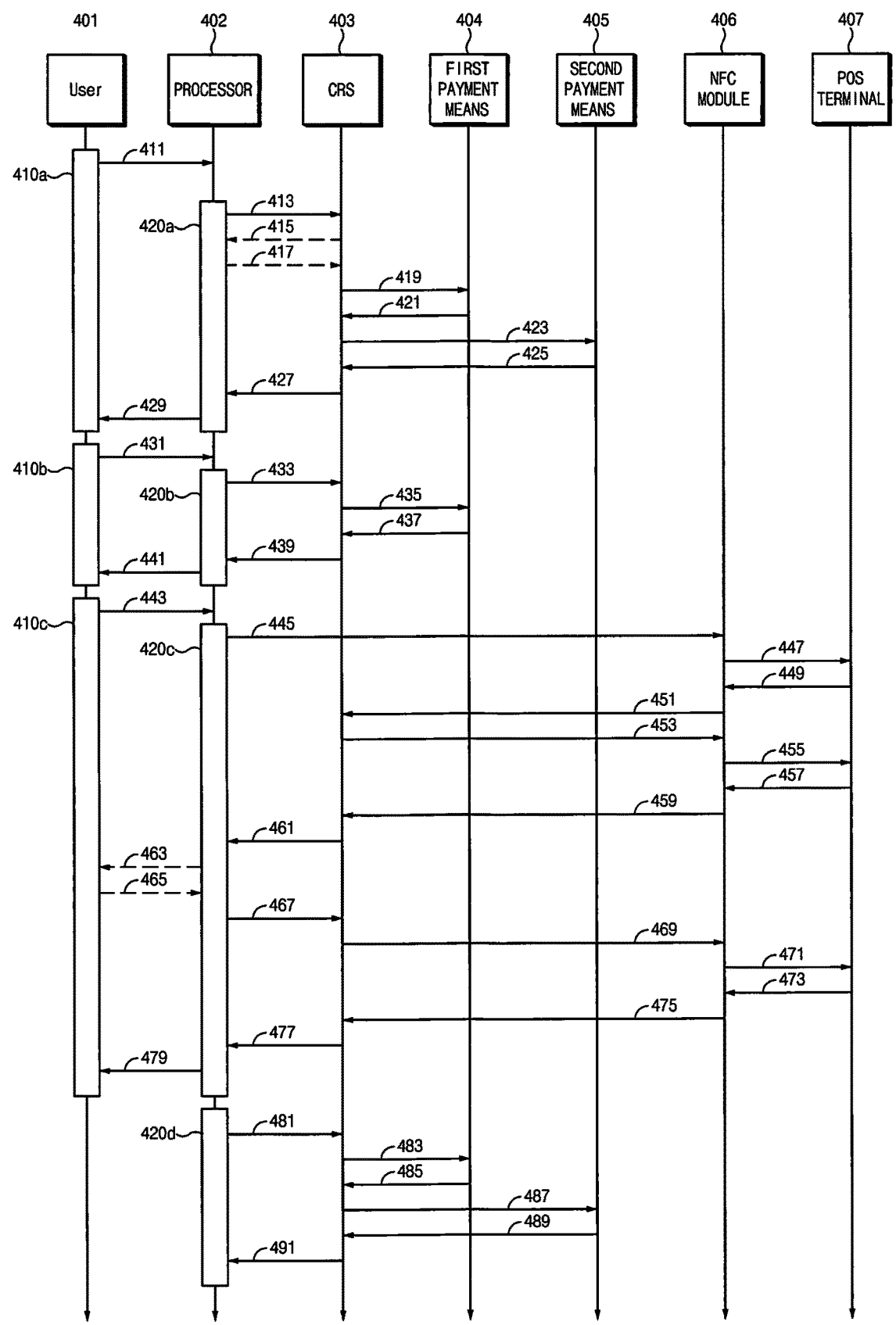
FIG. 4 is a signal sequence diagram of a method of operating a payment system associated with processing a payment according to an embodiment of the present disclosure.

FIG. 4 is a signal sequence diagram of a method of operating a payment system associated with processing a payment according to an embodiment of the present disclosure.

Referring to FIG. 4, if a user 401 performs a step 410a of executing a payment application (e.g., if the user 401 selects an execution icon of the payment application), in step 411, the payment system may send a request to execute the payment application to a processor 402.

According to an embodiment of the present disclosure, the processor 402 may perform a "START SAMSUNG PAY" instruction in step 420a (or send the "START SAMSUNG PAY" instruction in step 420a to a CRS 403) in response to the request to execute the payment application. For example, the processor 402 may set up an execution environment of the payment application and may request the CRS 403 to deactivate at least one payment means registered with an eSE in step 413. In this case, in step 415, the CRS 403 may send a current status of the at least one payment means registered with the eSE to the processor 402 (e.g., the processor 402 may send a "GET STATUS" instruction to the CRS 403 and may receive a list and statuses of mobile cards registered with the eSE). The processor 402 may store the sent status information of the at least one payment means in a memory of the electronic device. In addition, in step 417, the processor 402 may send a response to step 415 to the CRS 403. The electronic device may omit at least one of step 415 or step 417.

According to an embodiment of the present disclosure, if a request is received to deactivate the at least one payment means (e.g., a first payment means 404 and a second payment means 405) registered with the eSE, in steps 419 and 423, the CRS 403 may send the request to deactivate the payment means to the first payment means 404 and the second payment means 405, respectively. In steps 421 and 425, the CRS 403 may receive a response to the request to deactivate the payment means from the first payment means 404 and the second payment means 405, respectively.

According to an embodiment of the present disclosure, if a status is verified of the at least one payment means registered with the eSE, in step 427, the CRS 403 may send a response to step 413 (e.g., a response to the request to deactivate the payment means) to the processor 402. The response to step 413 may include status information (e.g., a status type) of the at least one payment means registered with the eSE.

According to an embodiment of the present disclosure, the CRS 403 may change a status of a payment means rather than sending an activation and/or deactivation request to the payment means registered with the eSE and may send the result according to the performance of the change as a response to the processor 402.

According to an embodiment of the present disclosure, if the response to step 413 is received, in step 429, the processor 402 may complete the execution of the payment application and may display an execution screen (e.g., a payment home screen) of the payment application to the user 401.

According to an embodiment of the present disclosure, if the user 401 performs a step 410b of selecting a certain payment means (e.g., if the user 401 selects the certain payment means among at least one payment means displayed on the execution screen of the payment application), in step 431, the payment system may send a request to change a payment means to the processor 402.

According to an embodiment of the present disclosure, the processor 402 may perform a "START USE CARD" instruction 420b (or may send the "START USE CARD" instruction to the CRS 403) in response to the request to change the payment means. For example, in step 433, the processor 402 may request the CRS 403 to activate the selected certain payment means. In this case, in step 435, the CRS 403 may send an activation request to the selected certain payment means (e.g., the first payment means 404). In addition, in step 437, the CRS 403 may receive a response to step 435.

According to an embodiment of the present disclosure, if a status of the selected certain payment means is verified, in step 439, the CRS 403 may send a response to step 433 (e.g., a response to the request to activate the selected certain payment means) to the processor 402. The CRS 403 may change a status of a payment means to an activation status rather than transmitting the request to activate the selected certain payment means and may send the result according to the performance of the change as a response to the processor 402.

According to an embodiment of the present disclosure, if the response to step 433 is received, in step 441, the processor 402 may complete the selection of the payment means and may display information of the selected payment means (e.g., a type of the payment means, a number of the payment means, an expiration date of the payment means, or the like) on an execution screen of the payment application.

According to an embodiment of the present disclosure, if the user 401 performs a step 410c of paying by the selected payment means (e.g., if the electronic device accesses a POS terminal 407), in step 443, the payment system may send a payment request to the processor 402 to perform a payment instruction 420c (or may send the payment instruction 420c to the CRS 403).

According to an embodiment of the present disclosure, in step 445, the processor 402 may connect with the POS terminal 407 via an NFC module 406 in response to the payment request. In this case, in step 447, the NFC module 406 may send a connection request to the POS terminal 407. In step 449, the POS terminal 407 may send a response to the connection request to the NFC module 406. The POS terminal 407 may send an instruction to select a PPSE (e.g., a "SELECT PPSE" instruction) to the NFC module 406, together with (or rather than) the response to the connection request in step 449.

According to an embodiment of the present disclosure, in step 451, the NFC module 406 may send the instruction to select the PPSE to the CRS 403. In step 453, the CRS 403 may send a PPSE of the certain payment means (e.g., the first payment means 404) selected (or activated) through the step 410b of selecting the certain payment means to the NFC module 406 in response to the instruction to select the PPSE. In step 455, the NFC module 406 may send the PPSE of the certain payment means to the POS terminal 407.

According to an embodiment of the present disclosure, in step 457, the POS terminal 407 may select a payment means with reference to the received PPSE of the certain payment means and may notify the NFC module 406 of identification information (e.g., an AID) of the selected payment means (or may send the identification information of the selected payment means to the NFC module 406). The POS terminal 407 may send payment related information (e.g., payment means information and payment information), for example, a payment object (or item), information about a seller of the payment object, a payment amount, or the like, together with the identification information of the selected payment means to the NFC module 406. In step 459, the NFC module 406 may send the identification information of the selected payment means (and payment related information) to the CRS 403 to select a payment means based on the identification information.

According to an embodiment of the present disclosure, if the payment means is selected, in step 461, the CRS 403 may send the payment related information (e.g., the payment means information and the payment information), for example, the payment object (or item), information about the seller of the payment object, the payment amount, a type of the payment means, a number of the payment means, an expiration date of the payment means, or the like to the processor 402. In step 463, the processor 402 may display the payment related information on an execution screen of the payment application. The payment application may provide an interface for user authentication (e.g., fingerprint authentication or entering a password) to the user 401 while displaying the payment related information. In step 465, if payment approval (and/or user authentication) is completed from the user 401, in step 467, the processor 402 may send a request to approve payment to the CRS 403. At least one of step 463 or step 465 may be omitted. For example, if user authentication is previously performed in connection with a selected payment means, the processor 402 may omit steps 463 and 465.

According to an embodiment of the present disclosure, in step 469, the CRS 403 may send a response to step 459 (e.g., a response to the selection of the payment means) to the NFC module 406 in response to the request to approve payment. In step 471, the NFC module 406 may send a response to step 457 (e.g., a response to the notification of the identification information of the selected payment means) to the POS terminal 407.

According to an embodiment of the present disclosure, the POS terminal 407 may send a payment request signal together with the payment related information to a payment server. If payment is completed, in step 473, the POS terminal 407 may send payment completion information to the NFC module 406. In step 475, the NFC module 406 may send the payment completion information to the CRS 403. In step 477, the CRS 403 may send the payment completion information to the processor 402. Steps 475 and 477 may be omitted. The NFC module 406 may send the payment completion information to the processor 402.

According to an embodiment of the present disclosure, in step 479, the processor 402 may display the payment completion information on the execution screen of the application and may perform an "END USE CARD" instruction 420d (or may send the "END USE CARD" instruction to the CRS 403). For example, in step 481, the processor 402 may deactivate the selected certain payment means and may request the CRS 403 to restore a status of the at least one payment means registered with the eSE. The processor 402 may send the status information of the payment means stored in step 415 to the CRS 403. Alternatively, if the request to restore the status of the payment means is received, the CRS 403 may refer to the stored status information of the payment means.

According to an embodiment of the present disclosure, in steps 483 and 487, the CRS 403 may change a status of each of the first payment means 404 and the second payment means 405, respectively, with reference to the stored status information of the payment means. In steps 485 and 489, the CRS 403 may receive a response to a status change of the payment means, respectively. In addition, in step 491, the CRS 403 may send a response to step 481 to the processor 402.

Figure 5:
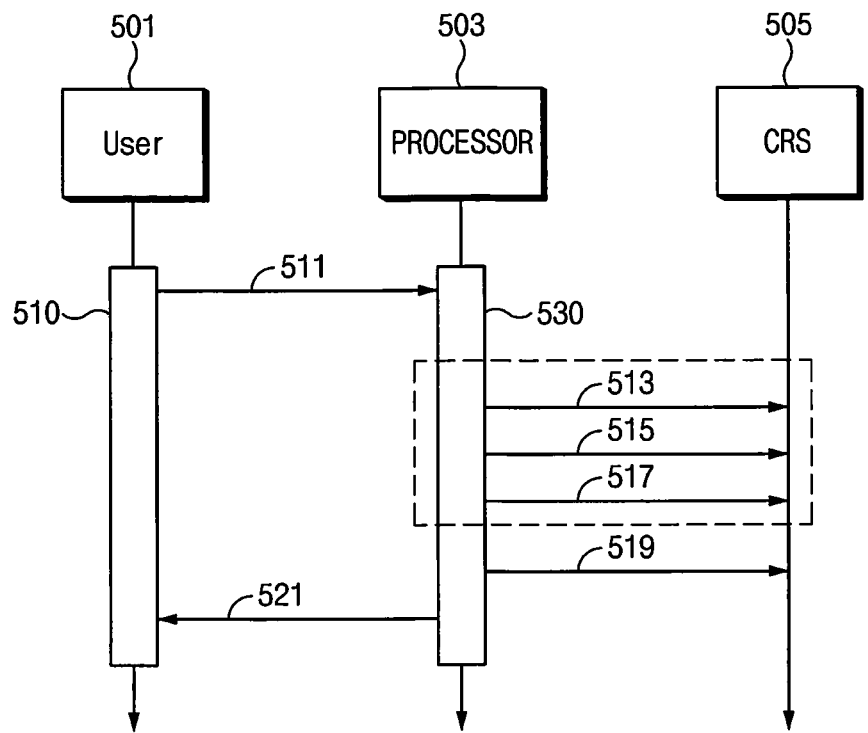
FIG. 5 is a signal sequence diagram of a method of operating an electronic device associated with setting a default card according to an embodiment of the present disclosure.

FIG. 5 is a signal sequence diagram of a method of operating an electronic device associated with setting a default card according to an embodiment of the present disclosure.

Referring to FIG. 5, if a user 501 performs a step 510 of setting a default card (or a default payment means) (e.g., if the user 501 selects a certain mobile card among mobile cards registered with an eSE as the default card), in step 511, a processor 503 may receive a request to set the default card.

According to an embodiment of the present disclosure, the processor 503 may perform a "SET DEFAULT CARD" instruction 530 (or may send the "SET DEFAULT CARD" instruction 530 to a CRS 505) in response to the request to set the default card. For example, if a frequently usable mobile card such as a transit card is registered with the eSE or if a certain mobile card is selected as the default card among mobile cards registered with the eSE by a user input, the processor 503 may request the CRS 505 to set the corresponding mobile card to the default card. In this case, the processor 503 may operate in a different way based on whether there is a default card to be set.

According to an embodiment of the present disclosure, if there is the default card to be set, in step 513, the processor 503 may terminate a payment application which is currently being executed and may request the CRS 505 to deactivate a currently activated mobile card (e.g., may send a "STOP SAMSUNG PAY" instruction to the CRS 505). In addition, in step 515, the processor 503 may send identification information (e.g., an AID) of a mobile card to be set to the default card to the CRS 505 to set the mobile card to the default card. The CRS 505 may set the mobile card to the default card and may simultaneously activate the mobile card.

If the mobile card is set to the default card, in step 517, the processor 503 may set a payment application using the mobile card to a default payment application using a "SET DEFAULT WALLET" instruction. According to an embodiment of the present disclosure, the processor 530 may send identification information (e.g., a package name) of the payment application to the CRS 505 to set the payment application to the default payment application. If the payment application using the mobile card is set to the default payment application, the user 501 may perform payment using a default card without executing the payment application.

If the payment application is set to the default payment application, in step 519, the processor 503 may send a "START SAMSUNG PAY" instruction to the CRS 505. In addition, in step 521, the processor 503 may send a response to step 511, for example, a response to a request to set a default card to the user 501. For example, the processor 503 may display a screen for providing notification that a mobile card selected by the user 501 is set to a default card on a display of the electronic device. According to an embodiment of the present disclosure, if there is no default card to be set, the processor 503 may omit steps 513 to 517 and may perform step 519.

Figure 6:
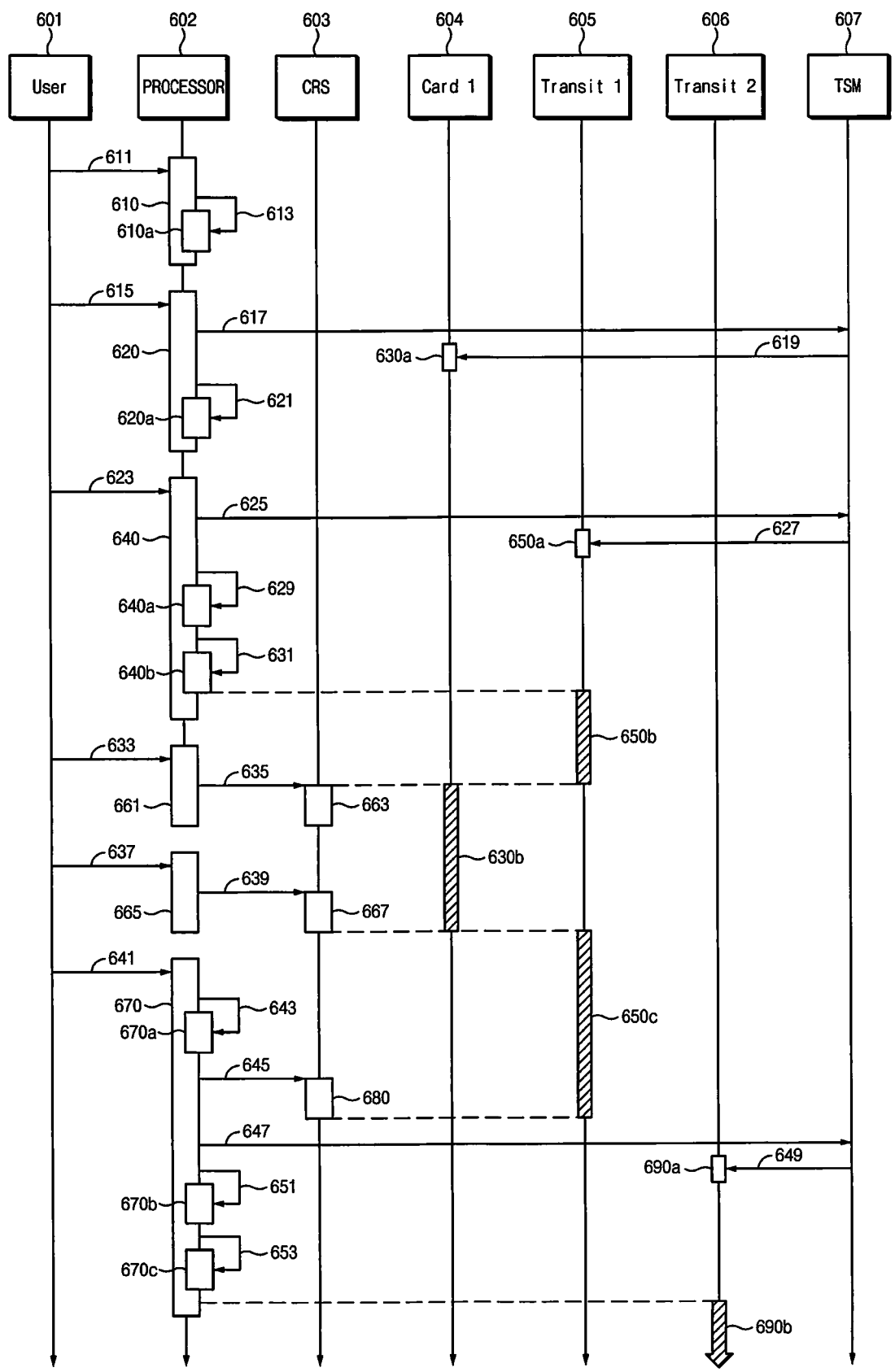
FIG. 6 is a signal sequence diagram of a method of operating an electronic device associated with selecting a default card according to an embodiment of the present disclosure.

FIG. 6 is a signal sequence diagram of a method of operating an electronic device associated with selecting a default card according to an embodiment of the present disclosure.

Referring to FIG. 6, a user 601 may execute a payment application. If the execution of the payment application is completed, in step 611, a processor 602 may receive a request to initialize a default card (or a default payment means). The processor 602 may perform a default card setting function 610 in response to the request to initialize the default card. In step 613, the processor 602 may perform an "INIT DEFAULT CARD" instruction 610*a* (or may send the "INIT DEFAULT CARD" instruction 610*a* to a CRS 603).

According to an embodiment of the present disclosure, if the user 601 registers a first credit card 604 (or a first debit card) with an electronic device, in step 615, the processor 602 may receive a request to register the first credit card 604. The processor 602 may perform a mobile card registration function 620 in response to the request to register the first credit card 604. For example, in step 617, the processor 602 may send information of the first credit card 604 together with a request to register a mobile card to a trusted service manager (TSM) 607. In this regard, the TSM 607 may be commissioned to have the right of issuing a mobile card from a financial institution (e.g., a credit card company, a bank, or the like), may be granted permission to use a mobile communication network from a mobile communication company, and may act as a proxy in issuing a mobile card to the electronic device.

According to an embodiment of the present disclosure, in step 619, the electronic device may register the first credit card 604 with an eSE based on the TSM 607. If the registered mobile card is not a default card (e.g., a frequently usable mobile card such as a transit card and a mobile card selected as the default card by a user input among mobile cards registered with the eSE), the electronic device may set a status of the registered mobile card to an inactive state. For example, the electronic device may set a status of the first credit card 604 to an inactive status 630*a*. In step 621, the processor 602 may perform an "INIT DEFAULT CARD" instruction 620*a* (or may send the "INIT DEFAULT CARD" instruction 620*a* to a CRS 603) simultaneously with the registration of the first credit card 604 or at intervals of time from the registration of the first credit card 604.

According to an embodiment of the present disclosure, if the user 601 registers the first transit card 605 with the electronic device, in step 623, the processor 602 may receive a request to register the first transit card 605. The processor 602 may perform a mobile card registration function 640 in response to the request to register the first transit card 605. For example, in step 625, the processor 602 may send information of the first transit card 605 together with a request to register a mobile card to the TSM 607.

According to an embodiment of the present disclosure, in step 627, the electronic device may register the first transit card 605 with the eSE. If the registered mobile card is the transit card, the electronic device may determine the registered mobile card as a default card and may set a status of the registered mobile card to an active status. For example, the electronic device may first register a status of the first transit card 605 to an inactive status 650*a* and may change the status of the first transit card 605 to an active status 650*b* through a function of setting the first transit card 605 to the default card. In step 629, the processor 602 may perform a "SET DEFAULT CARD" instruction 640*a* (or may send the "SET DEFAULT CARD" instruction 640*a* to the CRS 603) simultaneously with the registration of the first transit card 605 or at intervals of time from the registration of the first transit card 605. In addition, in step 631, the processor 602 may perform an "INIT DEFAULT CARD" instruction 640*b* (or may send the "INIT DEFAULT CARD" instruction 640*b* to the CRS 603). The processor 602 may store information of the default card (e.g., the identification information (e.g., the AID) of the first transit card 605) in a memory of the electronic device.

According to an embodiment of the present disclosure, if the user 601 selects the first credit card 604 registered with the eSE as a payment means or if the user 601 pays using the first credit card 604, in a state where the first transit card 605 is set to the default card, in step 633, the processor 602 may receive a request to use the first credit card 604 (or a request to activate the first credit card 604). The processor 602 may perform a function 661 of activating the first credit card 604 in response to the request to use the first credit card 604 (or the request to activate the first credit card 604). For example, in step 635, the processor 602 may send a "START USE CARD" instruction 663 together with the identification information (e.g., the AID) of the first credit card 604 to the CRS 603. Thus, the status of the first credit card 604 may be changed to an active status 630*b*. The CRS 603 may change a status of the currently activated first transit card 605 to an inactive state.

According to an embodiment of the present disclosure, if the user 601 terminates the use of the first credit card 604 or if a payment using the first credit card 604 is completed in a state where the first credit card 604 is activated, in step 637, the processor 602 may receive a request to terminate the use of the first credit card 604 (or a request to deactivate the first credit card 604). The processor 602 may perform a function 665 of deactivating the first credit card 604 in response to the request to terminate the use of the first credit card 604 (or the request to deactivate the first credit card 604). For example, in step 639, the processor 602 may send an "END USE CARD" instruction 667 to the CRS 603. The processor 602 may send the identification information of the first credit card 604 together with the "END USE CARD" instruction 667 to the CRS 603. Thus, the status of the first credit card 604 may be changed to an inactive status. If there is set default card, the CRS 603 may activate the corresponding default card. For example, the CRS 603 may change the status of the first transit card 605 to an active status 650c.

According to an embodiment of the present disclosure, if the user 601 registers a second transit card 606, in step 641, the processor 602 may receive a request to register the second transit card 606. The processor 602 may perform a mobile card registration function 670 in response to the request to register the second transit card 606. If another transit card (e.g., the first transit card 605) is registered instead of the second transit card 606, in step 643, the processor 602 may perform a "CLEAR DEFAULT CARD" instruction 670a (or may send the "CLEAR DEFAULT CARD" instruction 670a to the CRS 603). For example, the processor 602 may clear information of the default card stored in the memory and, in step 645, may send a "REMOVE DEFAULT CARD" instruction 680 to the CRS 603. Thus, the status of the first transit card 605 set to the default card may be changed to an inactive status 650c. In addition, in step 647, the processor 602 may send information of the second transit card 606 together with a request to register a mobile card to the TSM 607.

According to an embodiment of the present disclosure, in step 649, the electronic device may register the second transit card 606 as an inactive status 690a with the eSE. In addition, the electronic device may change a status of the second transit card 606 to an active status 690b through a function of setting the second transit card 606 to the default card. In step 651, the processor 602 may perform a "SET DEFAULT CARD" instruction 670b (or may send the "SET DEFAULT CARD" instruction 670b to the CRS 603) simultaneously with registration of the second transit card 606 or at intervals of time from registration of the second transit card 606. In addition, in step 653, the processor 602 may perform an "INIT DEFAULT CARD" instruction 670c (or may send the "INIT DEFAULT CARD" instruction 670c to the CRS 603). The processor 602 may store information of the default card (e.g., identification information (e.g., an AID) of the second transit card 606) in the memory.

According to an embodiment of the present disclosure, if the second transit card 606 is registered in a state where the first transit card 605 is set to the default card, the electronic device may maintain the first transit card 605 as the default card.

As described above, according to an embodiment of the present disclosure, a payment processing method in an electronic device may include obtaining a user input for selecting a first payment means among a plurality of payment means included in an eSE of the electronic device, activating the first payment means, and deactivating the other payment means except for the first payment means among the plurality of payment means.

According to an embodiment of the present disclosure, the payment processing method may further include deactivating the first payment means, if a payment using the activated first payment means is completed.

According to an embodiment of the present disclosure, the payment processing method may further include restoring a status of each of the plurality of payment means to a status before the user input is obtained, if a payment using the activated first payment means is completed.

According to an embodiment of the present disclosure, the plurality of payment means may include a second payment means configured to perform a transit card function. The payment processing method may further include activating the second payment means, if a payment using the activated first payment means is completed, and deactivating the other payment means except for the second payment means.

According to an embodiment of the present disclosure, the payment processing method may further include storing status information of the plurality of payment means in the memory, if the user input for selecting the first payment means is obtained.

According to an embodiment of the present disclosure, the payment processing method may further include storing status information of the plurality of payment means in a memory of the electronic device, if a payment application for supporting a payment using one of the plurality of payment means is executed, and deactivating the plurality of payment means.

According to an embodiment of the present disclosure, the payment processing method may further include restoring a status of each of the plurality of payment means based on the status information of the plurality of payment means stored in the memory, if the payment application is terminated.

Figure 7:
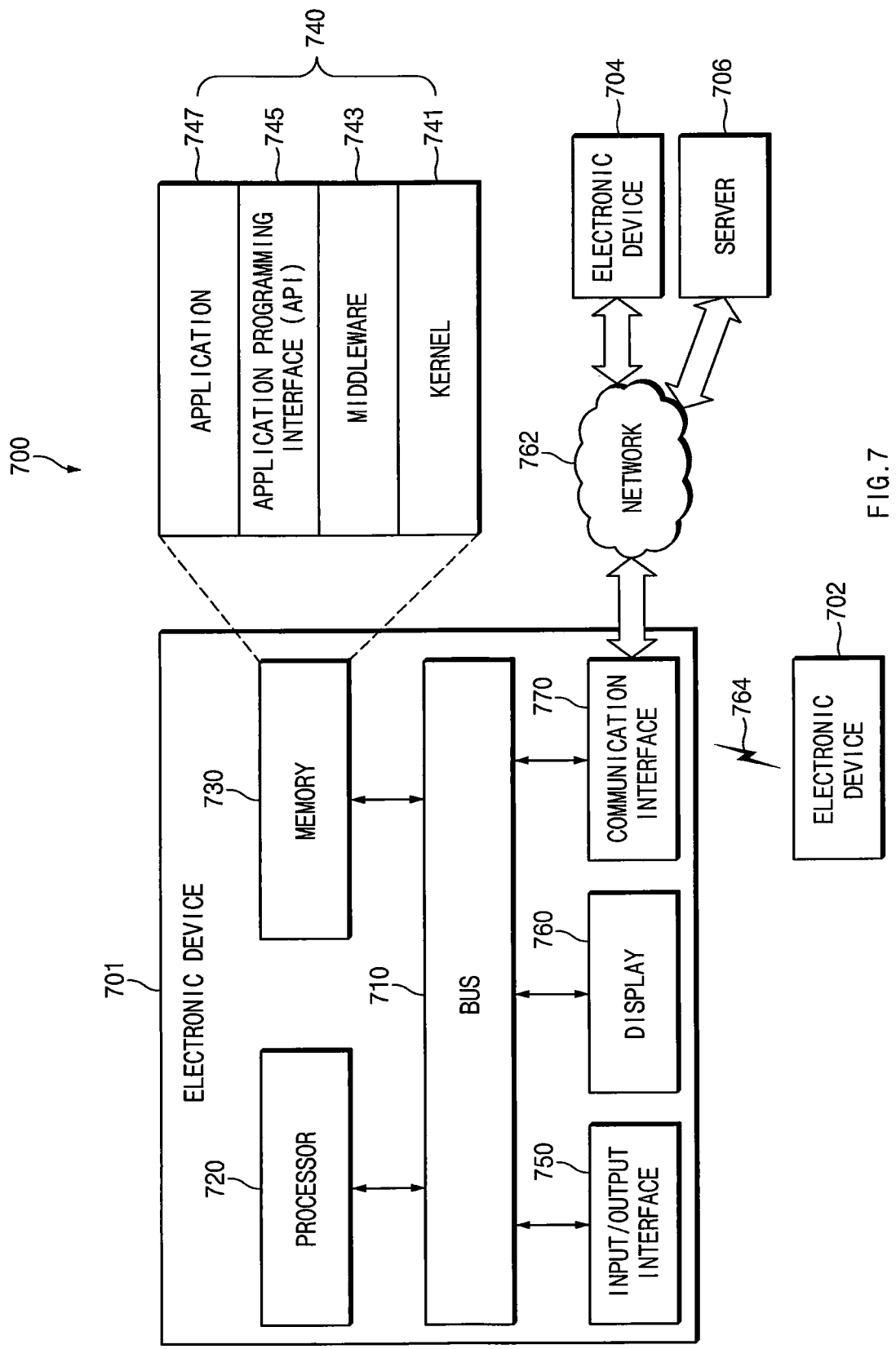
FIG. 7 is a block diagram of an electronic device in a network environment according to an embodiment of the present disclosure.

FIG. 7 is a block diagram of an electronic device 701 in a network environment 700 according to an embodiment of the present disclosure.

Referring to FIG. 7, the electronic device 701 may include a bus 710, a processor 720, a memory 730, an input/output interface 750, a display 760, and a communication interface 770. In an embodiment of the present disclosure, at least one of the foregoing elements may be omitted or another element may be added to the electronic device 701.

The bus 710 may include a circuit for connecting the above-mentioned elements 710 to 770 to each other and transferring communications (e.g., control messages and/or data) among the above-mentioned elements.

The processor 720 may include at least one of a central processing unit (CPU), an application processor (AP), or a communication processor (CP). The processor 720 may perform data processing or a step related to communication and/or control of at least one of the other elements of the electronic device 701.

The memory 730 may include a volatile memory and/or a nonvolatile memory. The memory 730 may store instructions or data related to at least one of the other elements of the electronic device 701. According to an embodiment of the present disclosure, the memory 730 may store software and/or a program 740. The program 740 may include, for example, a kernel 741, a middleware 743, an application programming interface (API) 745, and/or an application program (or an application) 747. At least a portion of the kernel 741, the middleware 743, or the API 745 may be referred to as an operating system (OS).

The kernel 741 may control or manage system resources (e.g., the bus 710, the processor 720, the memory 730, or the like) used to perform steps or functions of other programs (e.g., the middleware 743, the API 745, or the application program 747). Furthermore, the kernel 741 may provide an interface for allowing the middleware 743, the API 745, or the application program 747 to access individual elements of the electronic device 701 in order to control or manage the system resources.

The middleware 743 may serve as an intermediary so that the API 745 or the application program 747 communicates and exchanges data with the kernel 741.

Furthermore, the middleware 743 may process one or more task requests received from the application program 747 according to a priority order. For example, the middleware 743 may assign at least one application program 747 a priority for using the system resources (e.g., the bus 710, the processor 720, the memory 730, or the like) of the electronic device 701. For example, the middleware 743 may process the one or more task requests according to the priority assigned to the at least one application, thereby performing scheduling or load balancing with respect to the one or more task requests.

The API 745, which is an interface for allowing the application 747 to control a function provided by the kernel 741 or the middleware 743, may include, for example, at least one interface or function (e.g., instructions) for file control, window control, image processing, character control, or the like.

The input/output interface 750 may serve to transfer an instruction or data input from a user or another external device to (an)other element(s) of the electronic device 701. Furthermore, the input/output interface 750 may output instructions or data received from (an)other element(s) of the electronic device 701 to the user or another external device.

The display 760 may include, for example, a liquid crystal display (LCD), a light-emitting diode (LED) display, an organic LED (OLED) display, a microelectromechanical systems (MEMS) display, or an electronic paper display. The display 760 may present various content (e.g., a text, an image, a video, an icon, a symbol, or the like) to the user. The display 760 may include a touch screen, and may receive a touch, gesture, proximity or hovering input from an electronic pen or a part of a body of the user.

The communication interface 770 may set communications between the electronic device 701 and an external device (e.g., a first external electronic device 702, a second external electronic device 704, or a server 706). For example, the communication interface 770 may be connected to a network 762 via wireless communications or wired communications so as to communicate with the second external electronic device 704 or the server 706.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, short-range communications 764. The short-range communications may include at least one of wireless fidelity (Wi-Fi), Bluetooth, NFC, magnetic stripe transmission (MST), or GNSS.

The MST may generate pulses according to transmission data and the pulses may generate electromagnetic signals. The electronic device 701 may transmit the electromagnetic signals to a reader device such as a POS (point of sales) device. The POS device may detect the magnetic signals by using an MST reader and restore data by converting the detected electromagnetic signals into electrical signals.

The GNSS may include, for example, at least one of a global positioning system (GPS), a global navigation satellite system (GLONASS), a BeiDou navigation satellite system (BeiDou), or Galileo, the European global satellite-based navigation system according to a use area or a bandwidth. The terms "GPS" and "GNSS" may be used interchangeably. Wired communications may include at least one of a universal serial bus (USB), a high definition multimedia interface (HDMI), a recommended standard 232 (RS-232), a plain old telephone service (POTS), or the like. The network 762 may include at least one telecommunications network, for example, a computer network (e.g., a local area network (LAN) or a wide area network (WAN)), the Internet, or a telephone network.

The types of the first external electronic device 702 and the second external electronic device 704 may be the same as or different from the type of the electronic device 701. According to an embodiment of the present disclosure, the server 706 may include a group of one or more servers. A portion or all of the steps performed in the electronic device 701 may be performed in one or more other electronic devices (e.g., the first electronic device 702, the second external electronic device 704, or the server 706). If the electronic device 701 performs a certain function or service automatically or in response to a request, the electronic device 701 may request at least a portion of the functions related to the function or service from another device (e.g., the first electronic device 702, the second external electronic device 704, or the server 706) instead of or in addition to performing the function or service itself. The other electronic device (e.g., the first electronic device 702, the second external electronic device 704, or the server 706) may perform the requested function or an additional function, and may transfer a result of the performance to the electronic device 701. The electronic device 701 may use a received result or additionally process the received result to provide the requested function or service. To this end, for example, a cloud computing technology, a distributed computing technology, or a client-server computing technology may be used.

According to an embodiment of the present disclosure, the electronic device 701 may include a secure element (e.g., the secure element 160 of FIG. 1). The secure element may be a storage medium which securely stores information (e.g., authentication information) requested to perform security and applications (e.g., applets) using the information and may include a SIM/UICC, an eSE (e.g., the eSE 161 of FIG. 1 or the eSE 260 of FIG. 2), a micro SD card, or the like.

Figure 8:
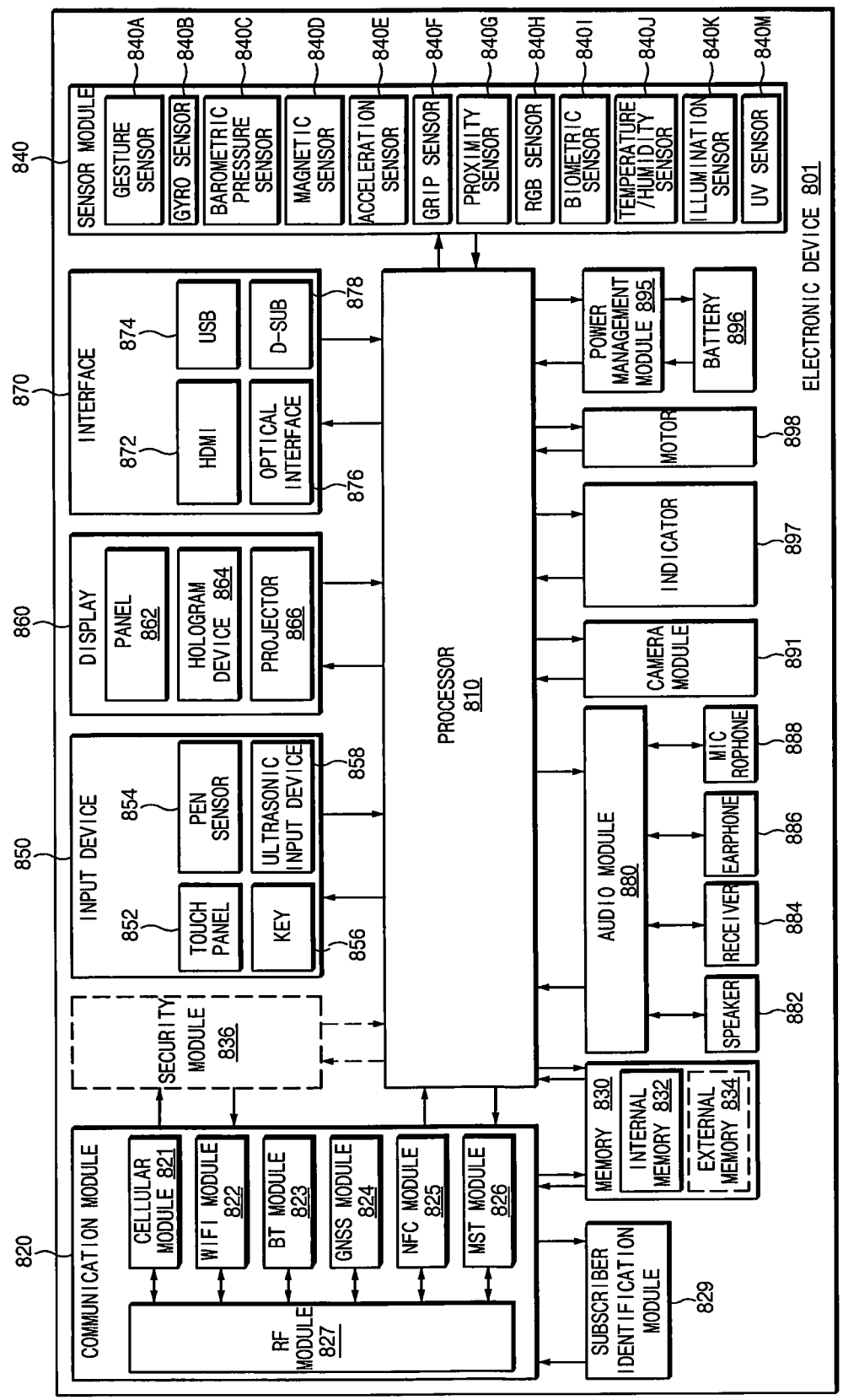
FIG. 8 is a block diagram of an electronic device according to an embodiment of the present disclosure.

FIG. 8 is a block diagram of an electronic device 801 according to an embodiment of the present disclosure.

Referring to FIG. 8, the electronic device 801 may include, for example, all or part of the electronic device 701 shown in FIG. 7. The electronic device 801 may include one or more processors 810 (e.g., application processors (APs)), a communication module 820, a subscriber identification module (SIM) 829, a memory 830, a security module 836, a sensor module 840, an input device 850, a display 860, an interface 870, an audio module 880, a camera module 891, a power management module 895, a battery 896, an indicator 897, and a motor 898.

The processor 810 may execute or drive, for example, an OS or an application program to control a plurality of hardware or software components connected thereto and may process and compute a variety of data. The processor 810 may be implemented with, for example, a system on chip (SoC). According to an embodiment of the present disclosure, the processor 810 may include a graphics processing unit (GPU) and/or an image signal processor. The processor 810 may include at least some (e.g., a cellular module 821) of the components shown in FIG. 8. The processor 810 may load a command or data received from at least one of the other components (e.g., a non-volatile memory) into a volatile memory to process data and may store various data in a non-volatile memory.

The communication module 820 may have the same or similar configuration as that of the communication interface 770 of FIG. 7. The communication module 820 may include, for example, the cellular module 821, a Wi-Fi module 822, a Bluetooth (BT) module 823, a GNSS module 824 (e.g., a GPS module, a GLONASS module, a Beidou module, or a Galileo module), an NFC module 825, an MST module 826, and a radio frequency (RF) module 827.

The cellular module 821 may provide, for example, a voice call service, a video call service, a text message service, or an Internet service, and the like through a communication network. According to an embodiment of the present disclosure, the cellular module 821 may identify and authenticate the electronic device 801 in a communication network using the SIM 829 (e.g., a SIM card). The cellular module 821 may perform at least part of functions which may be provided by the processor 810. The cellular module 821 may include a CP.

The Wi-Fi module 822, the BT module 823, the GNSS module 824, the NFC module 825, or the MST module 826 may include, for example, a processor for processing data transmitted and received through the corresponding module. According to an embodiment of the present disclosure, at least some (e.g., two or more) of the cellular module 821, the Wi-Fi module 822, the BT module 823, the GNSS module 824, the NFC module 825, and the MST module 826 may be included in one integrated circuit (IC) or one IC package.

The RF module 827 may transmit and receive, for example, a communication signal (e.g., an RF signal). The RF module 827 may include, for example, a transceiver, a power amplifier module (PAM), a frequency filter, a low noise amplifier (LNA), an antenna, and the like. According to another embodiment of the present disclosure, at least one of the cellular module 821, the Wi-Fi module 822, the BT module 823, the GNSS module 824, the NFC module 825, or the MST module 826 may transmit and receive an RF signal through a separate RF module.

The SIM 829 may include, for example, a SIM card and/or an embedded SIM. The SIM 829 may include unique identification information (e.g., an integrated circuit card identifier (ICCID)) or subscriber information (e.g., an international mobile subscriber identity (IMSI)).

The memory 830 (e.g., the memory 730 of FIG. 7) may include, for example, an internal or embedded memory 832 or an external memory 834. The embedded memory 832 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 834 may include a flash drive, for example, a compact flash (CF) drive, a secure digital (SD) drive, a micro-SD drive, a mini-SD drive, an extreme digital (XD) drive, a multimedia card (MMC), a memory stick, and the like. The external memory 834 may operatively and/or physically connect with the electronic device 801 through various interfaces.

The security module 836 may be a module which has a relatively higher secure level than the memory 830 and may be a circuit which stores secure data and guarantees a protected execution environment. The security module 836 may be implemented with a separate circuit and may include a separate processor. The security module 836 may include, for example, an eSE which is present in a removable smart IC or chip or a removable SD card or is embedded in a fixed chip of the electronic device 801. In addition, the security module 836 may be driven by an OS different from the OS of the electronic device 801. For example, the security module 836 may operate based on a Java card open platform (JCOP) OS.

The sensor module 840 may measure, for example, a physical quantity or may detect an operational state of the electronic device 801, and may convert the measured or detected information to an electrical signal. The sensor module 840 may include at least one of, for example, a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red, green, blue (RGB) sensor), a biometric sensor 840I, a temperature/humidity sensor 840J, an illumination sensor 840K, and an ultraviolet (UV) light sensor 840M. Additionally or alternatively, the sensor module 840 may further include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor, and the like. The sensor module 840 may further include a control circuit for controlling at least one or more sensors included therein. According to an embodiment of the present disclosure, the electronic device 801 may further include a processor configured to control the sensor module 840, as part of, or independent of, the processor 810. While the processor 810 is in a reduced power or sleep state, the electronic device 801 may control the sensor module 840.

The input device 850 may include, for example, a touch panel 852, a (digital) pen sensor 854, a key 856, or an ultrasonic input device 858. The touch panel 852 may use at least one of, for example, a capacitive type, a resistive type, an infrared type, or an ultrasonic type. In addition, the touch panel 852 may further include a control circuit. The touch panel 852 may further include a tactile layer and may provide a tactile reaction to a user.

The (digital) pen sensor 854 may be, for example, part of the touch panel 852 or may include a separate sheet for recognition. The key 856 may include, for example, a physical button, an optical key, or a keypad. The ultrasonic input device 858 may allow the electronic device 801 to detect sound using a microphone 888 and to verify data through an input tool generating an ultrasonic signal.

The display 860 (e.g., the display 760 of FIG. 7) may include a panel 862, a hologram device 864, and a projector 866. The panel 862 may include the same or similar configuration as the display 760. The panel 862 may be implemented to be, for example, flexible, transparent, or wearable. The panel 862 and the touch panel 852 may be integrated into one module. The hologram device 864 may show a stereoscopic image in air using an interference of light. The projector 866 may project light onto a screen to display an image. The screen may be positioned, for example, internal to, or external from, the electronic device 801. According to an embodiment of the present disclosure, the display 860 may further include a control circuit for controlling the panel 862, the hologram device 864, or the projector 866.

The interface 870 may include, for example, an HDMI 872, a USB 874, an optical interface 876, and a D-subminiature (D-SUB) connector 878. The interface 870 may be included in, for example, the communication interface 770 shown in FIG. 7. Additionally or alternatively, the interface 870 may include, for example, a mobile high definition link (MHL) interface, an SD card/multimedia card (MMC) interface, or an Infrared Data Association (IrDA) standard interface.

The audio module 880 may convert sound to/from an electrical signal. At least part of the components of the audio module 880 may be included in, for example, an input and output interface 750 (or a user interface) shown in FIG. 7. The audio module 880 may process sound information input or output through, for example, a speaker 882, a receiver 884, an earphone 886, or the microphone 888, and the like.

The camera module 891 may be a device which captures a still image and a moving image. According to an embodiment of the present disclosure, the camera module 891 may include one or more image sensors (e.g., a front sensor or a rear sensor), a lens, an image signal processor (ISP), or a flash (e.g., an LED lamp or a xenon lamp).

The power management module 895 may manage, for example, power of the electronic device 801. According to an embodiment of the present disclosure, the power management module 895 may include a power management integrated circuit (PMIC), a charger IC or a battery gauge. The PMIC may have a wired charging method and/or a wireless charging method. The wireless charging method may include, for example, a magnetic resonance method, a magnetic induction method, an electromagnetic method, and the like. An additional circuit for wireless charging, for example, a coil loop, a resonance circuit, a rectifier, and the like may be further provided. The battery gauge may measure, for example, a remaining capacity of the battery 896 and a voltage, a current, or a temperature thereof while the battery 896 is charged. The battery 896 may include, for example, a rechargeable battery or a solar battery.

The indicator 897 may display a certain state of the electronic device 801 or part (e.g., the processor 810) thereof, for example, a booting state, a message state, or a charging state, and the like. The motor 898 may convert an electrical signal into a mechanical vibration and may generate a vibration, a haptic effect, and the like. The electronic device 801 may include a processing unit (e.g., a GPU) for supporting mobile TV. The processing unit for supporting mobile TV may process media data according to standards, for example, a digital multimedia broadcasting (DMB) standard, a digital video broadcasting (DVB) standard, a MediaFLO™ standard, and the like.

Each of the above-mentioned elements of the electronic device according to various embodiments of the present disclosure may be configured with one or more components, and names of the corresponding elements may be changed according to the type of the electronic device. The electronic device may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 9:
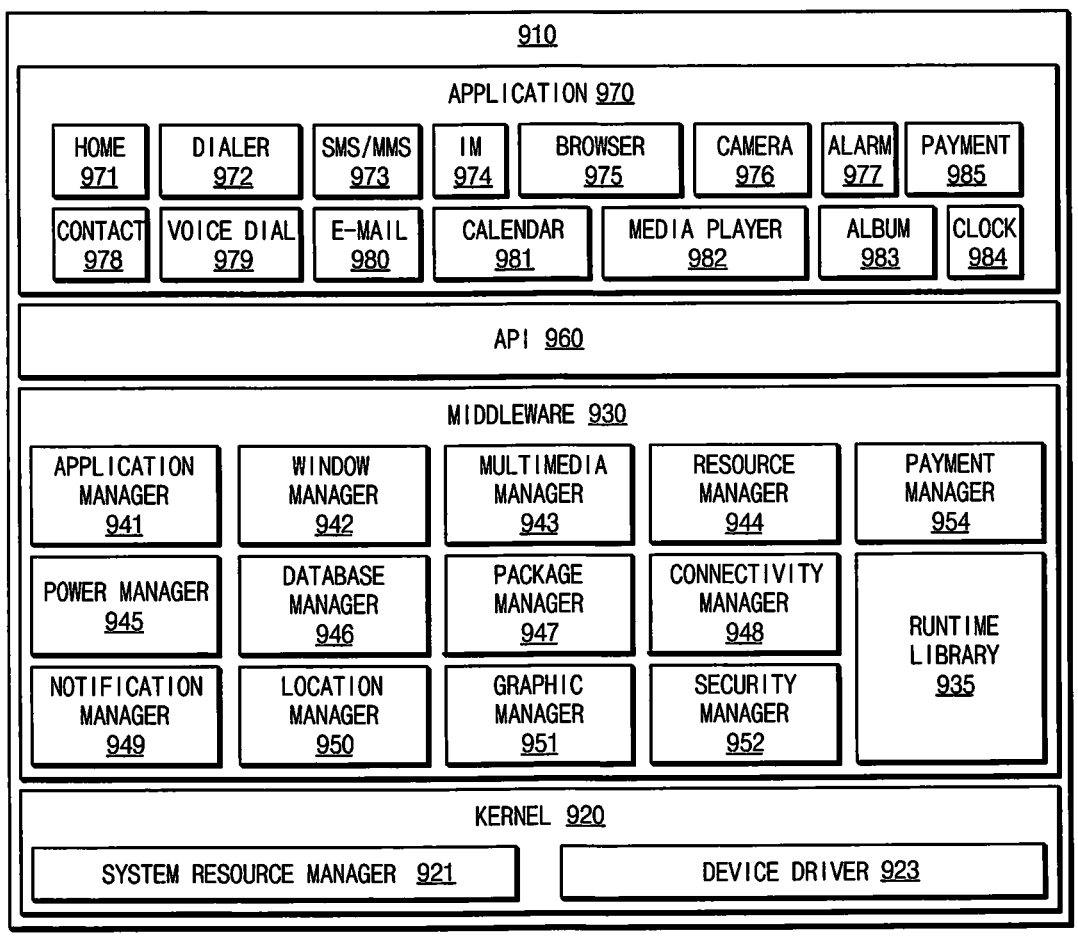
FIG. 9 is a block diagram of a program module according to an embodiment of the present disclosure.

FIG. 9 is a block diagram of a program module 910 according to an embodiment of the present disclosure.

Referring to FIG. 9, the program module 910 (e.g., the program 740 of FIG. 7) may include an OS for controlling resources associated with an electronic device (e.g., the electronic device 701 of FIG. 7) and/or various applications (e.g., the application program 747 of FIG. 7) which are executed on the OS. The OS may be, for example, Android®, iOS®, Windows®, Symbian®, Tizen®, or Bada™, and the like.

The program module 910 may include a kernel 920, a middleware 930, an application programming interface (API) 960, and/or an application 970. At least part of the program module 910 may be preloaded on the electronic device, or may be downloaded from a first external electronic device 702, a second external electronic device 704, a server 706, of FIG. 7, and the like.

The kernel 920 (e.g., the kernel 741 of FIG. 7) may include, for example, a system resource manager 921 and/or a device driver 923. The system resource manager 921 may control, assign, collect, and the like system resources. According to an embodiment of the present disclosure, the system resource manager 921 may include a process management unit, a memory management unit, a file system management unit, and the like. The device driver 923 may include, for example, a display driver, a camera driver, a BT driver, a shared memory driver, a USB driver, a keypad driver, a Wi-Fi driver, an audio driver, or an inter-process communication (IPC) driver.

The middleware 930 (e.g., the middleware 743 of FIG. 7) may provide, for example, functions the application 970 requires, and may provide various functions to the application 970 through the API 960 such that the application 970 efficiently uses limited system resources in the electronic device. According to an embodiment of the present disclosure, the middleware 930 (e.g., the middleware 743 of FIG. 7) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, and a payment manager 954.

The runtime library 935 may include, for example, a library module used by a compiler to add a new function through a programming language while the application 970 is executed. The runtime library 935 may perform a function about input and output management, memory management, or an arithmetic function.

The application manager 941 may manage, for example, a life cycle of at least one of the application 970. The window manager 942 may manage graphical user interface (GUI) resources used on a screen of the electronic device. The multimedia manager 943 may determine a format utilized for reproducing various media files and may encode or decode a media file using a codec corresponding to the corresponding format. The resource manager 944 may manage source code of at least one of the application 970, may manage resources of a memory or a storage space, and the like.

The power manager 945 may act together with, for example, a basic input/output system (BIOS) and the like, may manage a battery or a power source, and may provide power information utilized for a step of the electronic device. The database manager 946 may generate, search, or change a database to be used in at least one of the application 970. The package manager 947 may manage an installation or an update of an application distributed by a type of a package file.

The connectivity manager 948 may manage, for example, a wireless connection such as a Wi-Fi connection, a BT connection, and the like. The notification manager 949 may display or notify events, such as an arrival message, an appointment, and proximity notification, by a method which is not disturbed to the user. The location manager 950 may manage location information of the electronic device. The graphic manager 951 may manage a graphic effect to be provided to the user or a user interface (UI) related to the graphic effect. The security manager 952 may provide all security functions utilized for system security, user authentication, and the like. According to an embodiment of the present disclosure, if the electronic device (e.g., the electronic device 701 of FIG. 7) has a phone function, the middleware 930 may further include a telephony manager for managing a voice or video communication function of the electronic device.

The middleware 930 may include a middleware module which configures combinations of various functions of the above-described components. The middleware 930 may provide a module which is specialized according to a type of OS to provide a differentiated function. In addition, the middleware 930 may dynamically delete some components and may add additional components.

The API 960 (e.g., the API 745 of FIG. 7) may be, for example, a set of API programming functions, and may be provided with different components according to a type of OS. For example, in the case of Android® and iOS®, one API set may be provided according to these platforms. In the case of Tizen®, two or more API sets may be provided according to the platforms.

The application 970 (e.g., the application program 747 of FIG. 7) may include one or more of, for example, a home application 971, a dialer application 972, a short message service/multimedia message service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a clock application 984, a payment application 985, a health care application (e.g., an application for measuring a quantity of exercise or a blood sugar level, and the like), an environmental information application (e.g., an application for providing atmospheric pressure information, humidity information, temperature information, and the like), and the like.

According to an embodiment of the present disclosure, the application 970 may include an information exchange application for exchanging information between the electronic device (e.g., the electronic device 701 of FIG. 7) and an external electronic device (e.g., the first external electronic device 702 or the second external electronic device 704). The information exchange application may include, for example, a notification relay application for transmitting certain information to the external electronic device or a device management application for managing the external electronic device.

For example, the notification relay application may include a function of transmitting notification information, which is generated by other applications (e.g., the SMS/MMS application 973, the e-mail application 980, the health care application, or the environmental information application, and the like) of the electronic device, to the first external electronic device 702 or the second external electronic device 704. In addition, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device (or partial components) or a function of adjusting brightness (or resolution) of a display) of functions of the first external electronic device 702 or the second external electronic device 704 which communicates with the electronic device, an application which operates in the external electronic device, or a service (e.g., a call service or a message service) provided from the external electronic device.

According to an embodiment of the present disclosure, the application 970 may include an application (e.g., the health card application of a mobile medical device) which is preset according to attributes of the first external electronic device 702 or the second external electronic device 704. The application 970 may include an application received from the server 706, the first external electronic device 702, or the second external electronic device 704. The application 970 may include a preloaded application or a third party application which may be downloaded from a server. Names of the components of the program module 910 may differ according to the type of OS.

According to an embodiment of the present disclosure, at least part of the program module 910 may be implemented with software, firmware, hardware, or at least two or more combinations thereof. At least part of the program module 910 may be implemented (e.g., executed) by, for example, a processor (e.g., the processor 810 of FIG. 8). At least part of the program module 910 may include, for example, a module, a program, a routine, sets of instructions, a process, and the like for performing one or more functions.

According to an embodiment of the present disclosure, the electronic device may allow the user to select a desired payment means in a payment mode using the eSE.

Further, according to an embodiment of the present disclosure, the electronic device may reduce a payment processing time by simplifying an instruction to change a status of each of mobile cards installed in the eSE.

In addition, according to an embodiment of the present disclosure, the electronic device may provide various effects directly or indirectly ascertained through the present disclosure.

The term "module" used herein may indicate, for example, a unit including one of hardware, software and firmware or a combination thereof. The term "module" may be interchangeably used with the terms "unit," "logic," "logical block," "component" and "circuit." The term "module" may indicate a minimum unit of an integrated component or may be a part thereof. The term "module" may indicate a minimum unit for performing one or more functions or a part thereof. The term "module" may indicate an entity implemented mechanically or electronically. For example, the term "module" may include at least one of an application-specific integrated circuit (ASIC), a field-programmable gate array (FPGA), and a programmable-logic device for performing some operations, which are known or will be developed.

At least a part of devices (e.g., modules or functions thereof) or methods (e.g., operations) according to an embodiment of the present disclosure may be implemented as instructions stored in a non-transitory computer-readable storage medium in the form of a program module. In the case where instructions are performed by a processor (e.g., the processor 720 of FIG. 7), the processor may perform functions corresponding to the instructions. The non-transitory computer-readable storage medium may be, for example, the memory 730 of FIG. 7.

A non-transitory computer-readable recording medium may include a hard disk, a floppy disk, a magnetic medium (e.g., a magnetic tape), an optical medium (e.g., a compact disc ROM (CD-ROM), digital versatile disc (DVD)), a magneto-optical medium (e.g., a floptical disk), or a hardware device (e.g., a ROM, a RAM, a flash memory, or the like). Program instructions may include machine language code generated by compilers and high-level language code that can be executed by computers using interpreters. The above-mentioned hardware device may be configured to be operated as one or more software modules for performing operations of an embodiment of the present disclosure.

A module or a program module according to an embodiment of the present disclosure may include at least one of the above-mentioned elements, some elements may be omitted or other additional elements may be added. Operations performed by the module, the program module or other elements according to an embodiment of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope and spirit of the present disclosure. Therefore, the scope of the present disclosure is not intended to be limited to the embodiments, but is defined by the appended claims and equivalents thereof.

What is claimed is:

1. An electronic device, comprising:
   a memory;
   an embedded secure element (eSE) configured to store a first payment means and a second payment means; and
   a processor electrically connected with the memory and the eSE,
   wherein the processor is configured to:
   execute a payment application;
   transfer a first request to deactivate the first payment means and the second payment means to the eSE in response to an execution of the payment application;
   obtain a second request to activate the second payment means, while the payment application is being executed; and
   transfer a third request to activate the second payment means to the eSE based on the second request.

2. The electronic device of claim 1, wherein the processor is further configured to:
   receive first payment means information indicating a status of the first payment means and second payment means information indicating a status of the second payment means from the eSE before transferring the first request, and
   store the first payment means information and the second payment means information in the memory.

3. The electronic device of claim 2, wherein the processor is further configured to:
   restore the status of the first payment means and the status of the second payment means based on the stored first payment means information and the stored second payment means information in response to a termination of the payment application.

4. The electronic device of claim 1, wherein the processor is further configured to:
   receive a fourth request for performing a payment; and
   selectively perform the payment based on a result of authentication of an user.

5. The electronic device of claim 1, wherein the processor is further configured to:
   obtain an user input corresponding to the second request via an execution screen of the payment application.

6. An electronic device, comprising:
   an embedded secure element (eSE) configured to comprise a plurality of payment means;
   a memory configured to store a payment application for supporting a payment using one of the plurality of payment means;
   a display;
   a short-range communication module configured to send information about at least one payment means which is in an active status among the plurality of payment means to an external device through short-range communication; and
   a processor electrically connected with the eSE, the memory, the display, and the short-range communication module,
   wherein the processor is configured to:
   transfer a first request, to the eSE, to deactivate the plurality of payment means in response to an execution of the payment application; and
   transfer a second request, to the eSE, to activate a first payment means among the plurality of payment means, if a user input for selecting the first payment means among the plurality of payment means is obtained.

7. The electronic device of claim 6, wherein the processor is further configured to transfer a third request, to the eSE, to deactivate the first payment means, if the payment using the activated first payment means is completed.

8. The electronic device of claim 6, wherein the processor is further configured to restore a status of each of the plurality of payment means to a status before the execution of the payment application, after payment using the activated first payment means is completed.

9. The electronic device of claim 6, wherein the plurality of payment means comprises a second payment means configured to perform a transit card function, and
   wherein the processor is further configured to:
   activate the second payment means, if payment using the activated first payment means is completed; and
   deactivate payment means other than the second payment means while the second payment means is activated.

10. The electronic device of claim 6, wherein the processor is further configured to:
    receive status information of the plurality of payment means from the eSE, the status information indicating a status of the plurality of payment means before the execution of the payment application, and
    store the status information of the plurality of payment means in the memory.

11. The electronic device of claim 10, wherein the processor is further configured to:
    restore a status of each of the plurality of payment means based on the status information of the plurality of payment means stored in the memory, if the payment application is terminated.

12. A payment processing method in an electronic device, the method comprising:
    transferring a first request to an embedded secure element (eSE) of the electronic device to deactivate a first payment means in response to an execution of a payment application;
    obtaining a user input for selecting a first payment means among the plurality of payment means stored in the eSE; and transferring a second request, to the eSE, to activate the first payment means among the plurality of payment means in response to the user input.

13. The method of claim 12, further comprising transferring a third request, to the eSE, to deactivate the first payment means, if a payment using the activated first payment means is completed.

14. The method of claim 12, further comprising restoring a status of each of the plurality of payment means to a status before the user input is obtained, after payment using the activated first payment means is completed.

15. The method of claim 12, wherein the plurality of payment means comprises a second payment means configured to perform a transit card function, and the method further comprising:
activating the second payment means, if payment using the activated first payment means is completed; and
deactivating payment means other than the second payment means while the second payment means is activated.

16. The method of claim 12, further comprising
receiving status information of the plurality of payment means from the eSE, the status information indicating a status of the plurality of payment means before the execution of the payment application; and
storing the status information of the plurality of payment means in the memory.

17. The method of claim 16, further comprising
restoring a status of each of the plurality of payment means based on the status information of the plurality of payment means stored in the memory, if the payment application is terminated.

* * * * *